United States Patent Office 3,519,619
Patented July 7, 1970

3,519,619
16-ALKYLIDENE PREGNANES AND PROCESS FOR THEIR MANUFACTURE
Emanuel B. Hershberg, West Orange, Eugene P. Oliveto, Glen Ridge, and Richard C. Rausser, Union, N.J., assignors to Schering Corporation, Bloomfield, N.J., a corporation of New Jersey
No Drawing. Continuation-in-part of applications Ser. No. 861,207, and Ser. No. 861,208, both filed Dec. 22, 1959. This application Jan. 20, 1967, Ser. No. 610,474
Int. Cl. C07c *173/00*
U.S. Cl. 260—239.55                              21 Claims

ABSTRACT OF THE DISCLOSURE

Novel 3-oxygenated-16-alkylidene - 17α - hydroxy-20-keto-pregnanes and esters thereof, useful mainly as intermediates in the preparation of 16-alkylidene-progesterones and 16-alkylidene-corticoids having a valuable pharmacological properties, are prepared via a novel process whereby a 3-oxygenated-16-alkyl-20-keto-16-dehydropregnane is treated with an expoxidation reagent, preferably hydrogen peroxide in an alkaline medium, and the novel 3-oxygenated-16β-alkyl - 16α,17α - oxido-20-keto-pregnane thereby produced or a derivative thereof is treated with a strong, non-oxidizing acid in a non-aqueous solvent, preferably hydrogen bromide in acetic acid.

---

This application is a continuation-in-part of copending applications Ser. Nos. 861,207 now abandoned and 861,208 now U.S. Pat. No. 3,312,692 of Eugene P. Oliveto, Richard Rausser, and Emanuel Hershberg filed Dec. 22, 1959.

This invention relates to compositions of matter which may be classified in the art of chemistry as 16-alkylidene-pregnanes, to methods for their manufacture, and to novel intermediates produced thereby. More particularly, this invention relates to the preparation of 16-lower alkylidene progesterones and 16-lower alkylidene corticoids which are therapeutically active per se and are also valuable as intermediates. This invention also relates to 3,17α-dihydroxy-16-lower alkylidene compounds of the pregnane series (e.g. 16-methylene-17α-hydroxy-pregnenolone) which are valuable mainly as intermediates in the preparation of the aforementioned 16-lower alkylidene-progesterones and 16-lower alkylidene-corticoids; also included in this invention are 16α,17α-oxido-16β-lower alkyl pregnane intermediates in the preparation of the 16-lower alkylidene compounds.

The invention sought to be patented, in one of its composition aspects, is described as residing in the concept of a chemical compound having a molecular structure in which there is attached to a 20-keto-pregnane nucleus, an exocyclic lower alkylidene at C-16, an alpha hydroxy (or lower alkanoyloxy) at C-17, and an oxygenated function at C-3 (preferably a hydroxy or a hydrocarbon carboxylic acid ester thereof), which 20 keto-pregnane nucleus may possess other nuclear substituents and nuclear saturated and nuclear unsaturated systems. The 3-hydroxy-16-lower alkylidene pregnanes of this composition aspect of our invention are useful mainly as intermediates in preparing the therapeutically active 16-lower alkylidene progesterones and 16-lower alkylidene corticoids.

The invention sought to be patented in another of its composition aspects is described as residing in the concept of a chemical compound having a molecular structure in which there is attatched to a 20-keto-pregnane nucleus, a beta lower alkyl group at C-16, an alpha-epoxy group at C-16 and C-17, an oxygenated function at C-3 (preferably hydroxy or carboxylic acid ester thereof or a ketonic oxygen), which 20-keto-pregnane nucleus may possess other nuclear substituents and nuclear saturated and nuclear unsaturated systems. The compounds of this composition aspect are useful as intermediates for preparing the 16-lower alkylidene intermediates of this invention as well as therapeutically active 16-lower alkylidene-17α-hydroxy-progesterones and 16-lower alkylidene-17α-hydroxy corticoids.

The invention sought to be patented in its process aspect is described as residing in the concept of preparing a 16α,17α-epoxy derivative of a 16-lower alkyl-20-keto-16-dehydro compound of the pregnane series, and treating the resulting 16α,17α-oxido-16β-lower alkyl-20-keto-compound of the pregnane series with a non-oxidizing strong acid whereby cleavage of the 16α,17α-epoxy function is effected and there is formed a 16-lower alkylidene-17α-hydroxy-20-keto compound of the pregnane series, i.e. a 16-lower alkylidene compound of the composition aspect of this invention. Preferred among the non-oxidizing strong acids contemplated for use in the process aspect of this invention are the hydrogen halides, and particularly hydrogen bromide. In the process aspect of this invention, the 16α,17α-epoxy derivatives are preferably prepared via the action of alkaline hydrogen peroxide on a 16-lower alkyl-20-keto-16-dehydropregnane.

The present invention is based upon the surprising discovery that, in two steps, one can convert a 16-lower alkyl-20-keto-16-dehydro-pregnane into a 16-lower alkylidene-17α-hydroxy-20-keto-pregnane, and that this reaction is not affected to any substantial degree by the presence of other substituents in the pregnane molecule.

The term "pregnane" as used in this specification and in the claims includes both nuclearly saturated and nuclearly unsaturated compounds except where otherwise indicated. The term "pregnane" thus includes unsaturated derivatives such as 1-pregnenes, 4-pregnenes, 6-pregnenes, 1,4-pregnadienes, 4,6-pregnadienes, 1,4,6-pregnatrienes, 5-pregnenes, 9(11)-pregnenes and the like.

The manner and process of making and using the invention will now be generally described so as to enable a person skilled in the art of chemistry to make and use the same as follows:

The necessary intermediates for the process aspect of this invention, i.e. the 16β-lower alkyl-16α,17α-oxido-20-keto-pregnanes of the invention are conveniently and preferably prepared from the corresponding 16-lower alkyl-16-dehydro-pregnanes upon treatment with alkaline hydrogen peroxide. Some of the requisite 16-lower alkyl-16-dehydropregnane starting materials are known, e.g. 16-methyl-5,16-pregnadien-3β-ol-20-one. Other 16-lower alkyl-16-dehydropregnane starting compounds may be prepared from known compounds employing procedures well known in the art. For example, the known 5,16-pregnadien-3β-ol-20-one 3-acetate upon treatment with a diazo lower alkane, e.g. diazomethane, followed by pyrolysis of the 16α,17α-alkylenediazo intermediate, is converted to 16-methyl-5,16-pregnadien-3β-ol-20-one 3-acetate. By employing different diazo lower alkanes, there may be introduced other lower alkyl groups in the 16-position as, for example, the ethyl or butyl groups.

Alternatively, the requisite 16-alkyl-16-dehydro-starting compounds may be prepared from known 16-des-alkyl-precursors, e.g. 5,16-pregnadien-3β-ol-20-one 3-acetate, by reaction with a suitable alkyl magnesium halide such as ethyl magnesium iodide in the presence of copper salt to yield the corresponding 16-alkyl-5-pregnane, e.g. 16α-ethyl-5-pregnen-3β-ol-20-one. Esterification of the 3-hydroxyl is effected by acetic anhydride in pyridine yielding 16α-ethyl-5-pregnen-3β-ol-20-one 3-acetate. Bromination at C-17 (with concomitant addition of bromide at C-5 and C-6 followed by sodium iodide treatment to regenerate the double bond) by means of bromine in acetic acid followed by dehydrobromination of the thus formed 16α-ethyl-17α-bromo-5-pregnen-3β-ol-20-one 3-acetate with a basic agent such as collidine, dimethylformamide, lutidine or the like yields the requisite 16-alkyl-Δ$^{5,16}$-intermediate, 16-ethyl-5,16-pregnadien-3β-ol-20-one 3-acetate.

By a suitable choice of Grignard reagent when preparing the necessary 16-alkyl-16-dehydro-intermediates of our process, and desired 16-alkyl compound of the composition aspect of our invention may be obtained. Thus, reaction of 5,16-pregnadien-3β-ol-20-one with n-butyl magnesium bromide and subsequent acetylation yields 16α-n-butyl-5-pregnen-3β-ol-20-one 3-acetate. Bromination and dehydrobromination of the 16α-butyl-5-pregnene compounds as described above gives 16-n-butyl-5,16-pregnadien-3β-ol-20-one 3-acetate which, when epoxidized with alkaline hydrogen peroxide yields a necessary intermediate of our process, e.g. 16β-n-butyl-16α,17α-oxido-5-pregnen-3β-ol-20-one. Oxidation of the 3-hydroxy-5-pregnene according to the Oppenauer techniques employing aluminum isopropoxide affords the corresponding progesterone (3-keto-Δ$^4$) which when reacted according to our process with hydrogen bromide yields a 16-butylidene compound of this invention, i.e. 16-butylidene-17α-hydroxy-progesterone.

By our process, 16-lower alkyl-20-keto-16-pregnanes and allopregnenes having an oxygenated function at C-3, such as the 3-keto, 3-hydroxy (α and β), and the 3-lower alkanoyloxy compounds, can be converted to the corresponding 16-lower alkylidine compound with concomitant introduction of the valuable 17α-hydroxy group in two basic steps of high yield. The 3-hydroxy and 3-acyloxy compounds are the preferred starting compounds and for convenience will be referred to as exemplary of such starting compounds in the description hereinafter. In addition, for purposes of representation, methyl will be employed as typical of the lower alkyl group, and methylene of the lower alkylidene group.

In the first step of the process aspect of our invention, a 3-hydroxy-20-keto-16-lower alkyl-16-pregnene or allopregnane, or alternatively, the 3-lower alkanoate thereof, e.g. 16-methyl-16-pregnen-3β-ol-20-one 3-acetate, is treated with an appropriate epoxidation reagent so as to introduce a 16,17-oxido (i.e. epoxy) group thus forming, e.g. 16α,17α-oxido-16β-methyl-pregnan-3β-ol-20-one 3-acetate. While any of the appropriate reagents which have been used in this respect may be employed, we prefer to use hydrogen peroxide in alkaline medium. This we have found to be specific for a 16(17)-double bond when in conjugation with a keto function as is present in the 20-position. Thus, our reagent is selective when additional unsaturation is present as, for example, between C-5 and C-6 in a 5,16-pregnadiene. For example, 16-methyl-5,16-pregnadien-3β-ol-20-one 3-acetate upon reaction with alkaline hydrogen peroxide will selectively form an epoxy function at C-16,17 to produce 16α,17α-oxido-16β-methyl-5-pregnen-3β-ol-20-one 3-acetate.

Prior to the next step of our process, (i.e. treatment of the 16α,17α-epoxy-16-methyl-20-keto pregnane with a non-oxidizing strong acid), we have found it advantageous to esterify the hydroxyl group in the 3-position if such group is not already esterified. Although the free 3-hydroxyl compound can be employed, we have obtained higher yields and easier purification of the product in the case of the 3-acyloxy compound, presumably because of solubility differences. Any acyloxy group may be employed and, although for purposes of representation, the acetate group will be used in the present description as being typical, it should be noted that other ester groups may be employed, such as other lower alkanoates including propionate and butyrate, p-toluenesulfonate, and aryl carboxylates such as benzoate, and the like. Similarly, while the process is exemplified predominantly by the normal pregnane series (i.e. 5β-hydrogen at C-5) it is equally applicable to the allopregnane series (i.e. 5α-hydrogen at C-5) as well as in the 5-dehydro-pregnane series.

In the second step of the process aspect of this invention, the 16α,17α-oxido-16β-lower alkyl 20-keto pregnane (e.g. 16α,17α-oxido-16β-methyl-pregnane-3β-ol-20-one 3-acetate) prepared as described hereinabove, is treated with a strong non-oxidizing acid and there is prepared a 16-lower alkylidene-17α-hydroxy-20-keto-pregnane (e.g. 16-methylene-17α-hydroxy-pregnan-3β-ol-20-one 3-acetate).

Exemplary of the strong, non-oxidizing acids used are such as a hydrogen halide, as for example, hydrogen bromide, hydrogen chloride, hydrogen fluoride, or hydrogen iodide. Alternatively, other acids may be employed as the cleaving agent, for example, p-toluenesulfonic acid, trifluoroacetic acid, sulfuric acid and the like. Of the foregoing, hydrogen bromide is the preferred acid for use in our process. The quantity of acid employed may be as high as 1 mole per mole of steroid or preferably as low as 0.1 mole per mole of steroid. Under such conditions the 16,17-epoxy function is opened to form the 17α-hydroxyl group and concomitantly the 16-lower alkyl group is converted to a 16-lower alkylidene function.

The treatment of the 16β-lower alkyl-16α,17α-oxido-20-keto pregnane with strong acid is carried out in a suitable solvent such as lower alkanoic acids (preferably acetic acid), dioxane, benzene, toluene, xylene, tetrahydrofuran, dimethylformamide and the like. The temperature of the reaction medium is preferably maintained below 100° C., a range of 30° to 60° C. being generally suitable.

As described above, points of unsaturation other than the Δ$^{16}$-bond may be present in the starting compounds when carrying out our process. Thus, when 16-methyl-5,16-pregnadien-3β-ol-20-one is subjected to the procedures described above, there is formed 16-methylene-5-pregnene-3β,17α-diol-20-one 3-acetate, a compound particularly valuable in the preparation of 16-substituted derivatives of cortisone, prednisolone and related compounds. For example, this compound may be treated with bromine and the resulting 5,6,21-tribromo derivative, then treated with sodium iodide so as to introduce an iodine atom in the 21-position with concomitant debromination at C-5 and C-6. Subsequent treatment with an alkali metal lower alkanoate as, for example, potassium acetate then yields the 21-lower alkanoyloxy group. The 3-alkanoyloxy-5-dehydro system of the resulting 16-alkylidene compound, i.e. 16-methylene-5-pregnene-3β,17α,21-triol-20-one 3,21-diacetate can be readily converted to the 3-keto-4-dehydro system by the action of *Flavobacterium dehydrogenans* (see for example, Union of South Africa Pat. No. 3,462/55). The resulting 16-methylene-4-pregnene-17α,21-diol-3,20-dione 21-acetate is subjected to the action of *Bacillus sphaericus* to convert the 4-pregnene into a 1,4-pregnadiene system. Finally hydroxylation at C-11 may be effected by the micro-organism *Curvularia lunata* to yield 16-methyleneprednisolone.

By way of summary, our process preferably utilizes as starting compound a 3(α and β)-hydroxy (or alkanoyloxy)-16-methyl-20-keto-16-dehydro-compound selected from the group consisting of the pregnane (5β), allopregnane (5α), and the 5-dehydropregnane (5-pregnene) series. In a preferred mode of the process aspect of this invention there is first prepared a 16α,17α-oxido derivative of the aforementioned 16-methyl-20-keto-16-dehydropregnanes by the action of alkaline hydrogen peroxide, and then the resulting 16β-methyl-16α,17α-oxido-20-keto-pregnane intermediate of this invention is treated with hydrogen bromide in acetic acid to form a 3(α and β)-hydroxy (or alkanoyloxy)-16-methylene-17α-hydroxy-20-keto compound selected from the group consisting of the pregnane (5β), allopregnane (5α) and 5-dehydro-pregnane series (a 16-methylene-17α-hydroxy-20-keto-pregnane of this invention).

Typical preferred starting compounds of the process aspect of this invention thus include:

16-methyl-16-pregnen-3α-ol-20-one and the 3-acetate thereof, 16-methyl-16-allopregnen-3β-ol-20-one and the 3-acetate thereof, 16-methyl-16-pregnen-3β-ol-20-one and the 3-acetate thereof, 16-methyl-16-allopregnen-3α-ol-20-one and the 3-acetate thereof, 16-methyl-5,16-pregnadien-3β-ol-20-one and the 3-acetate thereof, and 16-methyl-5,16-pregnadien-3α-ol-20-one and the 3-acetate thereof.

By a preferred mode of our novel process as described hereinabove, the above listed 3-hydroxy-pregnane starting compounds are transformed into the following 16-methylene - 17α - hydroxy-pregnane - 3 - ols of the composition aspects of this invention:

16-methylene-17α-hydroxy-pregnan-3α-ol-20-one and the 3-acetate thereof, 16-methylene-17α-hydroxy-allopregnan-3β-ol-20-one and the 3-acetate thereof, 16-methylene-17α-hydroxy-pregnan-3β-ol-20-one and the 3-acetate thereof, 16-methylene-17α-hydroxy-allopregnan-3α-ol-20-one and the 3-acetate thereof, 16-methylene-17α-hydroxy-5-pregnen-3β-ol-20-one and the 3-acetate thereof, and 16-methylene-17α-hydroxy-5-pregnen-3α-ol-20-one and the 3-acetate thereof.

Esters of the above 3-hydroxy-16-methylene-17α-hydroxy pregnanes of the composition aspect of this invention, i.e. the saturated 3X-16-lower alkylidene-17α-hydroxy-20-keto normal (i.e. the 5β) and allo (i.e. the 5α) pregnanes, and the analogous 5-pregnenes, wherein X represents the alkali metal salt of a partial polybasic acid ester group (e.g. the disodium phosphate ester and the sodium succinyl ester group) are active as intravenous anaesthetics in dosages common for other steroid intravenous anaesthetics.

The 3,17α-dihydroxy-16-lower alkylidene-20-keto-pregnanes of our invention are valuable mainly as intermediates. Some representative modifications of the foregoing 16-lower alkylidene-17α-hydroxy pregnanes have already been described hereinabove, demonstrating their usefulness as intermediates as, for example, the conversion of 16-methylene-5-pregnene-3β,17α-diol-20-one 3-acetate to 16-methyleneprednisolone.

It is apparent that the key features of our invention in its process aspect involve modifications at C-16 and 17 and the groups attached thereto and that the applicability of the process is not affected by the presence of other groups elsewhere in the molecule. Furthermore, various other known reactions can be effected after the introduction of the 16-lower alkylidene function by our process in addition to the one illustrated above, whereby are prepared therapeutically valuable 16-lower alkylidene 17α-hydroxy-progesterones and 16-lower alkylidene-17α-hydroxy corticoids which include 16 - methylene - 17α - hydroxy-20-keto-pregnanes represented by the following Formula I:

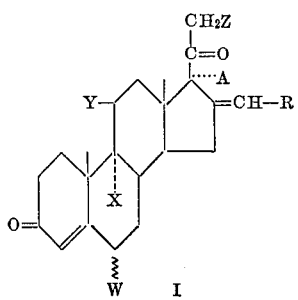

and include the 19-nor, 1-dehydro, 6-dehydro and 1,6-bis-dehydro analogs thereof wherein W is a member selected from the group consisting of hydrogen, methyl, and halogen, preferably chlorine and fluorine; X is a member selected from the group consisting of hydrogen and halogen; Y is a member selected from the group consisting of hydrogen, hydroxy, keto, acyloxy and halogen; and when Y is hydrogen, X is hydrogen; A is a member selected from the group consisting of hydrogen, hydroxy and acyloxy; R is a member selected from the group consisting of hydrogen and an alkyl radical having preferably up to four carbon atoms; and Z is a member of the group consisting of hydrogen, halogen (preferably iodine and fluorine) hydroxyl and acyloxy.

By the term "acyloxy" is contemplated hydrocarbon carboxylic acid radicals having up to eight carbon atoms, preferably lower alkanoic acids having up to six carbon atoms. These preferred radicals are those obtained from acids such as acetic, propionic, valeric, caproic, t-butylacetic, and the like.

The alkyl radical designated by "R" in the general formula preferably encompasses hydrocarbon radicals such as methyl, ethyl, n-propyl, isopropyl, n-butyl, sec.-butyl, and t-butyl, although higher homologs such as pentyl and hexyl come within the scope of this invention.

When X and Y are both halogen, there is contemplated halogen pairs such as (Cl, Cl), (Br, Br), (F, F), (Cl, Br), (Cl, F), (F, Cl), (F, Br), (I, Cl), (I, F), (Br, F), and the like.

In this specification, a bond shown as a curved or wavy line ($\zeta$), such as is shown at C-6, indicates that both the α and β-configurations are included. A compound name which does not specifically indicate the α or β-configuration implies the inclusion of both isomeric forms. Thus, the compound name 6-methyl-16-methyleneprogesterone includes the compounds 6α-methyl-16-methyleneprogesterone and 6β-methyl-16-methyleneprogesterone.

Contemplated as being within the scope of the 16-methylene-17α-hydroxy pregnanes prepared by the process aspect of this invention are 6, 17, or 21-monosubstituted, (6,17), (6,21), (17-21)-disubstituted, 6,17,21-trisubstituted-16-lower alkylideneprogesterones, their 9,11-dihalogeno and 11-oxygenated derivatives as well as the 19-nor, 1-dehydro, 6-dehydro and 1,6-bis-dehydro analogs thereof, and the corresponding corticoid analogs having hydroxyl or lower alkanoyloxy at the 21 carbon, with or without oxygen or hydroxyl at C-11, and/or 9α-halogen at the C-9 position.

The novel compounds of the general Formula I, wherein Z is hydrogen or halogen, as well as the 19-nor, 1-dehydro, 6-dehydro and 1,6-bis-dehydro analogs thereof, are active progestational agents and are described in co-pending application Ser. No. 861,208 filed Dec. 22, 1959, now U.S. Patent No. 3,312,692. When Z is hydroxy or acyloxy and the C-11 is substituted by oxygen or β-hydroxyl, the resulting 16-lower alkylene compounds possess cortical activity and are particularly useful as anti-inflammatory agents.

It has long been known that progesterone (the corresponding 16-unsubstituted analog of our novel 16-methylene-progesterone) has progestational activity. Progesterone, however, has the disadvantage of being therapeutically valuable only when administered parenterally. Surprisingly, our 16-lower alkylideneprogesterones are active when administered via both the parenteral and oral route. Moreover, 16-lower alkylideneprogesterones, such as 16-methyleneprogesterone, advantageously have a much greater potency than progesterone both when taken orally or parenterally and can thus be administered in smaller doses for equal effects.

Our novel 16-lower alkylideneprogesterones are preferably administered orally in the form of tablets which may contain excipients such as starch or sugar or other pharmaceutical carriers, or they can be administered as in the form of suspensions for intramuscular and subcutaneous administration.

Our 16-lower alkylideneprogesterones, in addition to being valuable pharmacologically, can be used also as intermediates in the preparation of other therapeutically active steroids. For example, a 21-iodo-16-alkylideneprogesterone of the general Formula I, such as 16-methylene-17α-hydroxy-21-iodoprogesterone, on treatment with a salt such as potassium acetate, is converted to a novel intermediate, i.e. 16-methylene - 4 - pregnene-17α,21-diol-3,20-dione 21-acetate. Microbiological hydroxylation of the aforementioned intermediate at C-11 by known techniques with, for example, *Curvularia lunata* yields the novel, therapeutically active 16-lower alkylidene-pregnane corticoid, 16-methylenehydrocortisone (i.e. 16-methylene-4-pregnene-11β, 17α,21-triol-3,20-dione).

The 16-lower alkylideneprogesterones defined by the general Formula I (except the 17α-hydroxyprogesterones which are valuable mainly as intermediates) all possess the therapeutic activity as described above. The preferred 16-methyleneprogesterones of our invention are 16-methylene compounds possessing a 17-acyloxy group, and in particular those having hydrogen or an oxygenated function at the 11-carbon. One of the preferred groups includes compounds such as 16-methylene-17α-hydroxyprogesterone 17-acetate, 6α-methyl-16-methylene-17α-acetoxyprogesterone, 6α-fluoro-16-methylene-17α-hydroxyprogesterone 17-caproate, 6α-methyl-9α-bromo-11β,17α-dihydroxy-16-methyleneprogesterone 17-acetate, 6α-methyl-9α-fluoro-11-keto-16-methylene-17α-acetoxyprogesterone, 9α-chloro-11β,17α-dihydroxy-16-methyleneprogesterone 11 - formate 17-acetate, and 16-methylene-17α-acetoxy-21-fluoroprogesterone. Some 9,11-dihalogeno compounds of the preferred 17α-acetoxy-16-methyleneprogesterones are 9α,11β-dichloro-16-methylene-17α-acetoxyprogesterone, 6α-methyl-9α-bromo-11β-fluoro-16-methylene - 17α - acetoxyprogesterone, 6α,9α,11β-trichloro-16-methylene-17α-acetoxyprogesterone, 6α,21-difluoro-9α,11β-dichloro - 16 - methylene - 17α - acetoxyprogesterone, and 9α,11β - difluoro-16-methylene-17β-acetoxyprogesterone.

The 16-lower alkylidene-17α-hydroxyprogesterones defined by Formula I, their 1-dehydro, 6-dehydro, 1,6-bis-dehydro and 19-nor analogs are valuable mainly as intermediates in the preparation of the corresponding 17α-acyloxy analogs, which are active progestins. In addition, the 9α,11β-dihalogeno-21-fluoro-16-alklidene-17α-hydroxyprogesterones of our invention, particularly their 1-dehydro analogs, possess anti-inflammatory activity, thus rendering these compounds therapeutically active per se.

By the process of this invention, there are also prepared 16-lower alkylidene corticoids, the preferred embodiment of which may be represented as steroids of the group having the following structural formula:

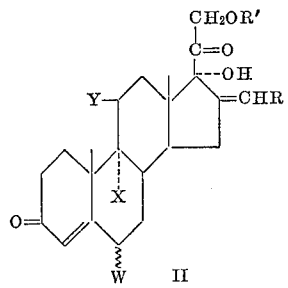

including the 1-dehydro, 6-dehydro and 1,6-bis-dehydro analogs thereof, wherein R, W, X, Y are as defined for Formula I hereinabove, and R¹ is a member of the group consisting of H and acyl radicals of pharmaceutically acceptable acids including hydrocarbon mono- and di-carboxylic acids as well as inorganic acids such as phosphoric, sulfuric and other acids.

The manner is which the process and the composition aspects of this invention are utilized to prepare valuable 16-methylene-17α-hydroxyprogesterones and 16-methylene corticoids of Formulae I and II, will now be described as to enable a person skilled in the art of chemistry to make and use the same.

According to the process aspects of this invention, any steroids molecule possessing a 16-lower alkyl-16,17,oxido function, may be converted by such process to the corresponding 16-lower alkylidene-17-hydroxy steroid. Thus, 16β-methyl-16α,17α-oxidoprogesterone and 9α-fluoro-16β-methyl-16α,17α-oxido-4-pregnene-11β,21-diol-3,20 - dione 21-acetate (prepared from 9α-fluorohydrocortisone 21-acetate by procedures described hereinbelow and in our application Ser. No. 861,211, now abandoned) when reacted with acetic acid and hydrogen bromide, will yield 16-methylene-17α-hydroxyprogesterone and 9α-fluoro-16-methyleneprednisolone 21-acetate, respectively.

Alternatively, the 16-alkylidene-17α-hydroxypregnanes of Formulae I and II are prepared from the 3-hydroxypregnane and the 3-hydroxy-5-pregnene precursors, i.e. the 3-hydroxy-16β-lower alkyl-16α,17α-oxido-pregnane and 5-pregnene intermediates of the composition aspect of this invention. Thus, 16β-methyl-16α,17α-oxido-5-pregnen-3β-ol-20-one 3-acetate when treated with acetic acid in the presence of hydrobromic acid yields 16-methylene-17α-hydroxy-5-pregnen-3β-ol-20-one 3-acetate. Conversion of the 3-alkanoyloxy-5-dehydro system to the 3-keto-4-dehydro system can then be readily effected such as by the action of *Flavobacterium dehydrogens* to obtain 16-methylene-17α-hydroxyprogesterone.

Esterification of the hydroxyl function at the 17-carbon in 16-methylene-17α-hydroxyprogesterone is conveniently effected with a lower fatty acid anhydride such as acetic anhydride in the presence of p-toluenesulfonic acid or, preferably, with a lower aliphatic acid such as acetic acid in the presence of trifluoroacetic anhydride to give the corresponding 17-ester, which in this case is 16-methylene-17α-acetoxyprogesterone. By substituting other lower alkanoic acids such as caproic or β-cyclopentylpropionic for acetic in the aforementioned esterification procedures, other 17α-lower alkanoate 16-lower alkylidene compounds are obtained such as the 17-caproate and the 17α(β-cyclopentyl)-propionate, respectively, of 16-methylene-17α-hydroxyprogesterone.

The manner in which substituents at C-6, 9, 11 and 21 as defined by moieties R', W, X, Y and Z in Formulae I and II are introduced into the steroid molecule is described below; the 16-lower alkylideneprogesterones being specifically discussed by way of example.

Iodine may be introduced in the 21-position of 16-lower alkylideneprogesterones such as 16-methylene-17α-hydroxyprogesterone by procedures which utilize iodine in the presence of an alkaline substance such as sodium hydroxide or calcium oxide, thus producing 21-iodo-16-lower alkylideneprogesterones of the general Formula I. The 17α-hydroxy-21-iodo substituted compound thus produced (e.g. 16-methylene-17α-hydroxy-21-iodoprogesterone) is conveniently converted to a 16-methylene-17α-acyloxy-21-iodoprogesterone by the usual esterification techniques.

The 21 - fluoro - 16 - lower alkylideneprogesterones are obtained from the corresponding 21-iodo analogs by the action of silver fluoride in moist acetonitrile. For example,, 21 - fluoro - 16-methylene-17α-hydroxyprogesterone is derived from 21 - iodo - 16 - methylene-17α-hydroxyprogesterone.

The 21 - fluoro - 16 - lower alkylidene-17α-lower alkanoate progesterones are conveniently prepared via an alternate route whereby iodine is introduced (in a manner similar to that described hereinabove) at C-21 of a 16α,17α - oxido precursor, e.g. 16β - methyl - 16α,17α-oxidoprogesterone, and in the 21-iodo derivative thus produced, e.g. 21 - iodo - 16β - methyl-16α,17α-oxido-progesterone, the 21-iodo group replaced by 21-fluoro. The resulting 21 - fluoro - 16α,17α - oxido-16β-methyl intermediate, e.g. 21 - fluoro - 16α,17α - oxido-16β-methyl-progesterone upon treatment with an acid/acid anhydride mixture such as acetic acid/trifluoroacetic anhydride utilizing techniques set forth in U.S. Pat. No.

3,168,537, is converted directly to a 16 - alkylidene-17α-alkanoyloxy - 21 - fluoroprogesterone, e.g. 16 - methylene-17α - acetoxy - 21 - fluoroprogesterone. In the foregoing procedure, by substituting other lower alkanoic acids, such as caproic and propionic, for acetic acid, there is obtained the corresponding 17 - caproate and the 17-propionate ester, e.g. 16 - methylene - 17α - hydroxy-21-fluoroprogesterone - 17 - caproate and 17 - propionate, respectively.

A 6-substituent is introduced into a 16-lower alkylidene - progesterone to form novel 6 - substituted - 16-lower alkylidene - progesterones by employing known chemical techniques. Esterification of the 3 - hydroxy group in a pregnenolone compound such as 16β-methyl-16α,17α - oxido - 5 - pregnene-3β-ol-20-one with, for example, acetic anhydride in pyridine, yields the corresponding 3-acyloxy ester, i.e., 16β - methyl - 16α,17α - oxido-5 - pregnen - 3β - ol-20-one 3-acetate. When the thus prepared 3-acetoxy ester is treated with acetic acid and hydrobromic acid for example, there is formed the corresponding 16 - methylene - 3β,17α - dihydroxy-5-pregnen - 20 - one 3-acetate. Treatment of the latter compound with ethylene glycol by known procedures yields the 20-ethylene ketal derivative which, in turn, is epoxidized on treatment with a peracid such as peracetic or, preferably, monoperphthalic acid to give the epoxy derivative, 3β,-17α - dihydroxy - 5α,6α - epoxy - 16-methylenepregnan-20 - one 3 - acetate 20 - ethylene ketal. The 6-methyl substituent is introduced into the pregnane nucleus by the addition to this epoxy derivative of a Grignard reagent such as methyl magnesium iodide which, with subsequent hydrolysis, yields a 5α-hydroxy-6-methyl intermediate, e.g. 3β,5α,17α - trihydroxy - 6β - methyl-16-methylene-pregnan - 20 - one 20-ethylene ketal. Chromic acid oxidation converts the 3β-hydroxypregnane to the corresponding 3-ketopregnane, 5α,17α - dihydroxy - 6β - methyl-16-methylenepregnane-3,20-dione 20-ethylene ketal. A reagent such as ethanolic hydrochloric acid used on the aforementioned 3-ketopregnane simultaneously dehydrates the 5α-hydroxy group, epimerizes the 6β-substituent, and regenerates the 20-ketone to yield, for example, 6α - methyl - 16 - methylene-17α-hydroxyprogesterone. In order to obtain a 6β - configuration, a 5α-hydroxy-6β-substituted pregnane intermediate (e.g. 5α,17α-dihydroxy-6β - methyl - 16 - methylenepregnane-3,20-dione 20-ethylene ketal) is treated with, for example, thionyl chloride in a cold basic medium such as pyridine or in approximately 90% acetic acid to give 16-alkylideneprogesterones such as 6β - methyl - 16 - methylene-17α-hydroxyprogesterone 20-ethylene ketal or 6β - methyl - 17α-hydroxy - 16 - methyleneprogesterone, respectively. A 6α-alkyl - 16 - lower alkylideneprogesterone may also be prepared from the corresponding 6β-substituted progesterone by means of alcoholic solutions of acids or bases such as ethanolic hydrogen chloride and ethanolic potassium hydroxide.

When preparing a 6 - alkyl - 16 - lower alkylidene-17α-acyloxyprogesterone of our invention, the 6-substituent may first be introduced into a 17α-hydroxy starting compound, followed by esterification of the 6 - substituted-17α - hydroxy - 16 - lower alkylideneprogesterone thereby formed. For example, 6α - methyl - 16 - methylene-17α caprooxyprogesterone is obtained by first preparing 6α-methyl - 16 - methylene - 17α-hydroxyprogesterone as shown above, followed by esterification by procedures heretofore described, such as with caproic acid in the presence of trifluoroacetic anhydride, yielding the corresponding 17α - acyloxyprogesterone, e.g. 6α - methyl-16-methylene - 17α - caprooxyprogesterone. Alternatively, the 6-substituent is introduced into a 16-lower alkyl-16α,17α-oxido starting compound which is then reacted with a strong, non-oxidizing acid according to our process to give the corresponding 16-lower alkyl - 16 - methylene-17α - hydroxyprogesterone which may then be esterified as described hereinabove. Thus, 6α,16β - dimethyl - 16α,17α-oxidoprogesterone when treated with hydrogen bromide in acetic acid yields 6α - methyl - 16 - methylene-17α-hydroxyprogesterone which, upon treatment with caproic acid in the presence of trifluoroacetic anhydride yields 6α - methyl - 16 - methylene - 17α-caprooxyprogesterone.

Our 6-halogeno substituted progesterones are conveniently prepared from 16 - methylene - 17α- -hydroxypregnenolones such as 16 - methylene - 5 - pregnene-3β, 17α - diol - 20 - one by addition of a halogenating agent across the 5,6-double bond followed by oxidation of the 3-hydroxyl function with, for example, chromic acid to the corresponding 3 - keto - 5,6 - dihalogeno-16-methylenepregnane. Subsequent dehydrohalogenation of the latter intermediates with sodium acetate yields the novel 6-halogeno compound, i.e. 6β - halogeno - 16 - methylene-17α-hydroxyprogesterone.

When a 6 - chloro - 16 - methyleneprogesterone is desired, a halogenating agent such as chlorine or bromine chloride is employed with a Δ⁵ - pregnenolone such as 16-methylene - 5 - pregnene - 3β,17α-diol-20-one to obtain the respective intermediates, 5,6 - dichloro - 16 - methylenepregnane - 3β,17α - diol - 20-one and 5-bromo-6-chloro - 16 - methylenepregnane - 3β,17α-diol-20-one. Oxidation of the 3-hydroxy function with for example chromic acid to the corresponding 3 - keo - 5,6 - dihalogenopregnane followed by dehydrohalogenation with sodium acetate yields the β-isomer, which in this case is 6β-chloro-16-methylene-17α-hydroxyprogesterone.

A 6β - fiuoro - 16 - lower alkylideneprogesterone of our invention is similarly obtained by employing halogenating agents such as bromine fluoride or chlorine fluoride with 16 - methylene - 5 - pregnene-3β,17α-diol-20-one. The necessary intermediates thereby formed, i.e. 5-bromo - 6 - fluoro - 16-methylene-17α-hydroxypregnane or 5 - chloro - 6 - fluoro-16-methylene-17α-hydroxypregnane respectively, when subjected to the series of reactions outlined in the preceding paragraph yields 6β-fluoro-16-methylene-17α-hydroxyprogesterone.

The 6β-chloro and 6β-fluoro-16-lower alkylideneprogesterones prepared above may be epimerized to the 6α-isomer by means of alcoholic solutions of acids or bases yielding the corresponding 6α-chloro-16-methylene-17α-hydroxyprogesterone and 6α-fluoro-16-methylene-17α-hydroxyprogesterone.

When utilizing reagents such as bromine fluoride, chlorine fluoride, chlorine or bromine chloride to prepare a 6-halogeno-16-lower alkylidene-17-acyloxprogesterone, it is preferred to carry through the above-described reaction sequence on a compound having 17α-hydroxy group and to esterify the resulting 6-halogeno-16-lower alkylidene - 17α - hydroxyprogesterone intermediate thereby formed by methods described above to obtain the desired 6-halogeno-16-lower alkylidene - 17α - acyloxyprogesterone.

An alternate method of introducing a 6-chloro group into the molecule utilizes as starting compounds the 16-lower alkylideneprogesterones of our invention and reagents such as N-bromosuccinimide or N-chlorosuccinimide as the halogen donor. By this method 16-methylene-17α-acetoxy-21-fluoroprogesterone, for example, is converted to the corresponding 3-enol-ether-3,5-diene by means of ethyl-o-formate in the presence of an acid catalyst such as sulfuric acid. The 3-ethoxy-16-methylene-17α-acetoxy-21-fluoro-3,5-pregnadien-20-one thus prepared when reacted with N-chlorosuccinimide, for example, in the presence of a solvent such as pyridine, with or without the aid of a catalyst such as p-toluenesulfuric acid, yields the 6β-epimer, 6β-chloro-16-methylene-17α-acetoxy - 21-fluoroprogesterone. The corresponding 6α-chloro-16-methylene-17α-acetoxy-21-fluoroprogesterone is obtained from the aforementioned 6β-chloro compound by treatment with alcoholic hydrogen chloride. When N-bromosuccinimide is used in the foregoing procedure instead of N-chlorosuccinimide, the corresponding 6-bromo compound of our invention is formed, i.e. 6β-bromo-16-methylene-17α-acetoxy-21-fluoroprogesterone.

An alternate method of introducing a 6-fluoro group into the molecule employs perchloryl fluoride as the halogenating agent and as starting compounds either a 3-enol-ether-3,5-diene exemplified by the above described 3-ethoxy-16-methylene-17α-acetoxy-21-fluoro-3,5 - pregnadien-20-one, or a 3-enol-ester-3,5-diene such as 3,17-diacetoxy-16-methylene-3,5-pregnadien-20-one. The latter intermediate is prepared from the corresponding 16-lower alkyl-16,17-oxidoprogesterone with an excess of acetic anhydride in the presence of p-toluenesulfonic acid. Specifically, 3,17-diacetoxy-16-methylene-3,5-pregnadien-20-one reacted with perchloryl fluoride in a solvent such as pyridine yields 6β-fluoro-16-methylene-17α-acetoxyprogesterone. The corresponding 6α-fluoro-16-methylene-17α-acetoxyprogesterone is obtained from the 6β-fluoro epimer by treatment with alcoholic hydrogen chloride.

Novel progesterones of Formula I possessing a hydrogen at C-17 are conveniently prepared by reacting a 16-lower alkylidene-17α-acyloxyprogesterone of the Formula I with an alkaline or an alkaline earth metal such as lithium or calcium in a basic medium such as liquid ammonia or diethylamine, or by the action of zinc in aqueous ethanol. In the former procedure it is preferable that the 3-keto group be protected with a ketal derivative such as the ethylene ketal. For example, 16-ethylidene-17α-acetoxyprogesterone upon treatment with ethylene glycol is converted to the corresponding 3-ethylene ketal derivative (i.e. 3-ethylenedioxy-16-ethylidene-17α-acetoxy-5-pregnen-20-one) which when reacted with calcium in liquid ammonia gives 3-ethylenedioxy-16-ethylidene-5-pregnen-20-one. Hydrolysis with a mild acid such as aqueous acetic regenerates the 3-ketone group to give 16-ethylideneprogesterone.

The 6β-chloro and 6β-fluoro-16-lower alkylideneprogesterones depicted by Formula I are prepared by reacting a suitable halogenating agent with a 16-lower alkylidene-4,9(11)-pregnadiene-3,20-dione or a 16-lower alkylidene-1,4,9(11)-pregnatriene-3,20-dione or with a 6,17, or 21-monosubstituted, or a (6,17), (6,21), or (17,21)-disubstituted, or a 6,17,21-trisubstituted-16-lower alkylidene-4,9(11)-pregnadiene-3,20-dione, the preferred substituents at the 6-carbon being fluorine, chlorine or methyl; and at the 2-carbon being fluorine or iodine. Our starting compounds are represented by Δ$^{9,11}$-unsaturated progesterones such as:

16-methylene-17α-hydroxy-4,9(11)-pregnadiene-3,20-dione,
16-methylene-17α-acetoxy-4,9(11)-pregnadiene-3,20-dione,
16-methylene-17α-caprooxy-4,9(11)-pregnadiene-3,20-dione,
16-methylene-1,4,9(11)-pregnatriene-17α-ol-3-one,
6β-fluoro-16-methylene-17α-hydroxy-4,9(11)-pregnadiene-3,20-dione,
6α-fluoro-16-methylene-17α-hydroxy-4,9(11)-pregnadiene-3,20-dione,
6α-chloro-16-methylene-17α-hyrdroxy-4,9(11)-pregnadiene-3,20-dione,
6α-methyl-16-methylene-17α-acetoxy-4,9(11)-pregnadiene-3,20-dione, and the like.

These starting materials necessarily possess a Δ$^{9,11}$-double bond which may be introduced into the molecule either before or after the 16-methylene group is added to the progesterone nucleus. In either case the process of forming the double bond between C-9 and C-11 is identical, i.e. a hydroxyl group is introduced microbiologically at C-11 with the aid of a micro organism, Curvularia lunata (N.R.R.L. 2380) or Rhizopus nigricans (A.T.C.C. 6227b) using procedures analogous to those in U.S. Pat No 2,658,023 and U.S. Pat. No. 2,602,769, respectively. When Curvularia lunata is employed the 11β-hydroxy steroid produced is dehydrated by a reagent such as methanesulfonyl chloride in the presence of pyridine or phosphorous oxychloride in pyridine to give the necessary intermediates. On the other hand, the action of Rhizopus nigricans on a progesterone such as 6α-methyl-16-methylene-17α - hydroxyprogesterone yields the corresponding 11α-hydroxy derivative, 6α-methyl-11α,17α-dihydroxy-16 - methyleneprogesterone. Subsequent treatment with a sulfonylchloride such as methanesulfonyl chloride or toluenesulfonyl chloride yields the corresponding 11α-sulfonate which, when treated with a base such as pyridine or sodium acetate, gives the 9,11-dehydro intermediate exemplified by 6α-methyl-16-methylene-17α-hydroxy-4,9(11) - pregnadiene-3,20-dione (6α-methyl-16-methylene-17α-hydroxy - 9(11)-dehydroprogesterone).

It is sometimes convenient to introduce the 9,11-bond prior to the 16-lower alkylidene group such as, for example, when one has an 11 hydroxy compound intermediate available such as 3β,11α-dihydroxy-5,16-pregnadiene-20-one. Selective esterification of the 3-hydroxy group by means of pyridine and acetic anhydride yields 3β-acetoxy-11α-hydroxy-5,16-pregnadiene-20 - one which is then esterified at C-11 with p-toluenesulfonyl chloride as described above. The resulting 11α-p-toluenesulfonate ester is dehydrated by means of sodium acetate and acetic acid to yield the 9,11-dehydro intermediate; 5,9(11), 16-pregnatriene-3β-ol-20-one 3-acetate. A 16-lower alkyl group is then introduced according to the previously described procedures such as that utilizing diazomethane followed by pyrolysis of the intermediary 16,17-pyrazolino compound to yield 16-methyl-5,9(11),16-pregnatrien - 3β-ol-20-one 3 - acetate. The 16,17 - epoxide is conveniently obtained from the latter compound by hydrogen peroxide in alkali. The resultant 16-lower alkyl-16,17-epoxy intermediate, e.g. 16β-methyl-16α,17α-oxido-5,9(11)-pregnadien-3β-ol-20-one is converted by means of hydrogen bromide in acetic acid, for example, to the corresponding 16-methylene-5,9(11)-pregnadiene-3β,17α-diol-20-one, a necessary intermediate for producing dihalogen-lower alkylideneprogesterones of our invention. Alternatively, the aforementioned 5,9(11)-pregnadiene, 16β-methyl - 16α,17α - oxido-5,9(11)-pregnadien-3β-ol-20-one may be converted to the corresponding progesterone (Δ$^4$-3-keto) via an Oppenauer oxidation to give 16β - methyl-16α,17α-oxido-9(11)-dehydroprogesterone. Treatment of this 16-alkyl-16,17-oxido intermediate with acetic acid and trifluoroacetic acid according to our novel process yields the corresponding 16-methylene-17α-acetoxy-9(11)-dehydro-progesterone.

In preparing 9,11-dihalogeno compounds which contain 17α-acyloxy groups it is possible to introduce the Δ$^{9,11}$-bond into a 16-lower alkylidene-17α-hydroxyprogesterone and then esterify the 17-hydroxyl group either before or after introducing halogen at the 9 and 11-positions. For example, 9α,11β-dichloro-16-methylene-17α-acetoxyprogesterone may be prepared by two routes. In one, 16-methylene-17α-acetoxy-9(11)-dehydroprogesterone is prepared as described in the preceding paragraph or, alternatively, 16-methylene-17α-hydroxy-9(11) dehydroprogesterone is converted by known techniques to the aforementioned 17-acetate ester which is then chlorinated at C-9 and C-11 with, for example, lithium chloride, hydrogen chloride and N-chlorosuccinimide. Alternatively, 16-methylene-17α-hydroxy-9(11)-dehydroprogesterone is chlorinated with chlorine and pyridine in carbon tetrachloride, for example, to give the novel 9α, 11β - dichloro - 16-methylene-17α-hydroxyprogesterone. Esterification with acetic acid and trifluoroacetic anhydride yields the desired 9α, 11β-dichloro-16-methylene-17α-acetoxyprogesterone.

In general, the 9α,11β-dihalogeno compounds of the general formula are prepared from the above-mentioned 9(11) - dehydro-16-lower alkylideneprogesterone intermediates by utilizing halogenating reagents under reaction conditions described in U.S. Pat. No. 2,894,963 and in the copending applications of Robinson and Gould et al., Ser. Nos. 817,079 and 817,048, respectively, both filed June 1, 1959, now U.S. Pats. Nos. 3,009,933 and 3,049,554, respectively.

Our 9α-halogeno-11-oxygenated-16-lower alkylideneprogesterones are also conveniently prepared from the 16-lower alkylidene-9(11)-dehydroprogesterone intermediates described heretofore. For example, 6α-methyl-16-methylene - 17α-acetoxy-4,9(11)-pregnadiene-3,20-dione when reacted with N-bromoacetamide in aqueous dioxane in the presence of perchloric acid according to known techniques yields the novel 6α-methyl-9α-bromo-11β,17α-dihydroxy-16-methyleneprogesterone 17-acetate.

Other 9α-halogeno-11β-hydroxy-16-lower alkylideneprogesterones of our invention, i.e. the 9α-iodo, chloro and fluoro are obtainable from the corresponding 9β,11β-oxido-16-lower alkylideneprogesterones which, in turn, are derived from the 9α - bromo-11β-hydroxy-16-lower alkylideneprogesterones by treatment with potassium acetate in ethanol or acetone. Addition of hydrogen chloride in chloroform or of hydrogen fluoride in chloroform-tetrahydrofuran, or of hydrogen iodide in acetic acid to a 9β,11β-oxidoprogesterone yields the corresponding 9α-chloro-11β-hydroxy, 9α-fluoro-11β-hydroxy, or 9α-iodo-11β-hydroxy, respectively. Thus, 6α-methyl-9α-bromo-11β,17α-dihydoxy-16-methyleneprogesterone 17 - acetate is converted to 6α-methyl-9β,11β-oxido-16-methylene-17α-hydroxyprogesterone 17-acetate. Addition of hydrogen fluoride to the oxide yields 6α-methyl-9α-fluoro-11β-hydroxy-16-methylene-17α-acetoxyprogesterone of our invention. By using hydrogen chloride or hydrogen iodide instead of hydrogen fluoride with the aforementioned oxidoprogesterone, there is obtained 6α-methyl-9α-chloro-11β-hydroxy-16-methylene-17α - acetoxyprogesterone and 6α - methyl-9α-iodo-11β-hydroxy-16-methylene-17α-acetoxyprogesterone.

Esterification of the 9α-halogeno-11β-hydroxy-16-lower alkylideneprogesterones of our invention by means of, for example, acetic acid and trifluoroacetic anhydride yields the corresponding 11-acylate, e.g. 11-acetate.

By utilizing the above procedure it is obvious that one needs but to choose the appropriate Δ⁹⁽¹¹⁾-intermediate to obtain compounds such as 9α-fluoro-11β,17α-diacetoxy - 16 - methyleneprogesterone; 6α,9α - difluoro-16-fluoro - 11β,17α-diacetoxy-16-methyleneprogesterone; 6α-methyl-9α-fluoro-11β,17α-diacetoxy-16-methylene - 1-dehydroprogesterone (6α-methyl-9α-fluoro-11β,17α - diacetoxy-16-methylene-1,4-pregnadiene-3,20-dione); 6-chloro-9α - fluoro - 11β,17α-diacetoxy-16-methylene-6-dehydroprogesterone (6-chloro-9α-fluoro-11β,17α-diacetoxy - 16-methylene-4,6-pregnadiene-3,20-dione).

To obtain the 11-keto compounds of the general formulae the above 9,11-halohydrins such as 9α-fluoro-11β-hydroxy - 17α - acetoxy-16-methyleneprogesterone may be oxidized with, for example, chromic acid to give as a representative example 9α-fluoro-11-keto-16-methylene-17α-acetoxyprogesterone.

In preparing the 1-dehydro analogs of the previously described 16-lower alkylideneprogesterones, 11-oxygenated-16-lower alkylideneprogesterones and the 9α,11β-dihalogeno-16-lower alkylideneprogesterones of our invention, the Δ¹-bond may be introduced at various stages during the synthesis of the compound and preferably in the later stages. Thus, a 16-lower alkylidene-1-dehydroprogesterone such as 16-methylene - 17α-hydroxy-1,4-pregnadiene - 3,20 - dione, 6α-chloro-16-methylene-17α-hydroxy - 1,4 - pregnadiene-3,20-dione and 6α-methyl-9α-fluoro - 11β,17α-dihydroxy-16-methyleneprogesterone 17-acetate is prepared from the corresponding 16-lower alkylideneprogesterones, e.g. 16 - methylene-17α-hydroxyprogesterone, 6α - chloro - 16-methylene-17-acetoxyprogesterone and 6α - methyl - 9α-fluoro-11β,17α-dihydroxy-16-methyleneprogesterone 17-acetate by microbiological dehydrogenation with an organism such as Corynebacterium simplex (A.T.C.C. 6946) in a manner similar to that described in U.S. Pat. No. 2,837,464 or by chemical dehydrogenation through the use of a reagent such as selenium dioxide. Similarly, 9α,11β-dihalogeno-16-lower alkylidene-1-dehydroprogesterones of the general formula are obtained from their corresponding 9α,11β-dihalogeno-16-lower alkylideneprogesterones, for example, 9α,11β-dichloro - 21 - fluoro - 16-methylene-17α-hydroxyprogesterone is converted to 9α,11β - dichloro - 21-fluoro-16-methylene - 17α-hydroxy-1,4-pregnadiene-3,20-dione with the aid of Corynebacterium simplex. Alternatively, 9α, 11β - dihalogeno - 16-lower alkylidene-1-dehydroprogesterones are obtained by first dehydrogenating a 9(11)-dehydro - 16-lower alkylideneprogesterone intermediate such as 6α - methyl-16-methylene-17α-hydroxy-9(11)-dehydroprogesterone with Corynebacterium simplex to give 6α - methyl - 16-methylene-17α- hydroxy-1,4,9(11)-pregnatriene-3,20-dione which upon chlorination by previously described methods yields 6 - methyl-16-methylene-9α, 11β - dichloro-17α-hydroxy-1-dehydroprogesterone. The 17α-hydropregnadiene thus produced may then be converted to the 17-acyloxy compound by known esterification techniques to 6 - methyl - 16 - methylene-9α,11β-dichloro-17α-acetoxy-1-dehydroprogesterone.

The 6-dehydro analogs of the 16-lower alkylideneprogesterones described above are obtained by subjecting the corresponding progesterone to the oxidizing action of chloranil. The novel 6α - methyl - 16-methylene-17α-acetoxyprogesterone is transformed by means of chloranil to the 6-dehydro analog,
6-methyl-16-methylene-17α-acetoxy-6-dehydroprogesterone (6-methyl-16-methylene-17-hydroxy-4,6-pregnadiene-3,20-dione 17-acetate).

In like manner,

6α-fluoro-16-methylene-17α-acetoxyprogesterone,
6α-fluoro-16-methylene-17-acetoxyprogesterone,
6α-chloro-21-fluoro-16-methylene-17α-acetoxyprogesterone, and 6,21-difluoro-16-methylene-17α-acetoxyprogesterone are converted to 6-chloro-16-methylene-17α-acetoxy-6-dehydroprogesterone,
6-fluoro-16-methylene-17α-acetoxy-6-dehydroprogesterone, and
6-chloro-21-fluoro-16-methylene-17α-acetoxy-6-dehydroprogesterone, and
6,21-difluoro-16-methylene-17α-acetoxy-6-dehydroprogesterone.

The 16-lower alkylidene - 1,6-bis-dehydroprogesterones of our invention are preferably prepared from the corresponding novel 16 - lower alkylidene-6-dehydroprogesterones by known procedures utilizing selenium dioxide. For example, 6 - chloro - 16-methylene-17α-hydroxy-4,6-pregnadiene-3,20-dione 17-acetate reacted with selenium dioxide and mercury in t-butyl alcohol and acetic acid yields 6 - chloro - 16 - methylene-17α-hydroxy-1,4,6-pregnatriene 3,20 - dione 17 - acetate (6 - chloro-16-methylene-17α-hydroxy-1,6-bis-dehydroprogesterone 17-acetate).

The 19-nor analogs of our invention are obtained by pyrolysis of the heretofore described 16-lower alkylidene-1-dehydroprogesterones. For example, 16-methylene-17α-hydroxy - 1-dehydroprogesterone (16-methylene-17α-hydroxy-1,4-pregnadiene-3,20-dione) is pyrolyzed either in the solid state or in an inert solvent to effect elimination of the 19-methyl and concomitant aromatization of ring-A. The 3,17α - dihydroxy-16-methylene-17β-acetyl-1,3,5 (10)-estratriene thus obtained is converted to its 3-methyl ether with dimethylsulfate in alkaline methanol. The resultant 3 - methoxy - 16-methylene-17α-hydroxy-17β-acetyl-1,3,5(10)-estratriene is converted by means of ethylene glycol to the corresponding 20-ethylene ketal which is reacted with liquid ammonia and lithium in the presence of a proton donor (such as ethanol) and subsequently treated with a reagent such as methanolic hydrochloric acid to give 16 - methylene-17α-hydroxy-19- norprogesterone. In the last step of the aforementioned procedure, if one employs oxalic acid instead of hydrochloric acid there is obtained an intermediary compound, 16 - methylene-17α-hydroxy-19-nor-5(10)-pregnene-3,20-dione which upon stronger acid treatment is converted to the above 19 - norprogesterone, 16-methylene-17α-hydroxy - 19-nor-4-pregnene-3,20-dione. Esterification with trifluoroacetic anhydride and acetic acid yields 16-methylene - 17α-acetoxy-19-norprogesterone. By substituting other lower alkanoic acids such as caproic or t-butyl-acetic for acetic acid in the esterification procedure, one obtains the corresponding 17-lower alkanoates, i.e. 16-methylene - 17α-hydroxy-19-norprogesterone 17-caproate and 16-methylene-17α-hydroxy-19-norprogesterone 17-t-butylacetate.

The following compounds may be obtained from 16-methylene-17α-hydroxy-19-norprogesterone (prepared as above) by utilizing a series of reactions similar to those outlined heretofore for the corresponding 19-methyl analogs: 6α - methyl-16-methylene-17α-acetoxy-19-norprogesterone, 6α - fluoro-16-methylene-17α-hydroxy-19-norprogesterone, 6α - fluoro - 16-methylene-17α-acetoxy-19-norprogesterone, 6α,21 - difluoro - 16-methylene-17α-hydroxy - 19 - norprogesterone, and 6α,21-difluoro-16-methylene-17α-acetoxy-19-norprogesterone. The 21-iodo analogs of the above compounds as well as the 9,11-dihalogeno (9α,11β-dichloro, 9α-chloro-11β-fluoro, and the like) derivatives are also obtained by the procedures described above.

Compounds other than the above described 16-loweralkylidene-1-dehydroprogesterones which may be subjected to pyrolysis include the 11α-hydroxylated 16-alkylidene progesterones of our invention, which are conveniently prepared from the corresponding 11-desoxyprogesterones of our invention by treatment with *Rhizopus nigricans*. For example, 6α-fluoro-11α,17α-dihydroxy-16-methyleneprogesterone (obtained by the action of *Rhizopus nigricans* on 6α-fluoro-16-methylene-17α-hydroxyprogesterone) may be transformed by microbiological dehydrogenation by means of *Corynebacterium simplex* to the 1-dehydro analog, 6α-fluoro-11α,17α-dihydroxy-16-methylene - 1,4 - pregnadiene - 3,20-dione, which is transformed via pyrolysis and subsequent chemical transformation as described above into 6α-fluoro-11α,17α-dihydroxy-16-methylene19-nor-progesterone. By forming an 11-sulfonate acid ester such as 11-p-toluenesulfonate followed by reaction with sodium acetate and acetic acid according to procedures described heretofore, there is obtained 6α - fluoro - 16-methylene-17α-hydroxy-9(11)-dehydro-19-nor-progesterone, a useful intermediate in the preparation of 9α,11β-dihalogeno derivatives such as 6α-fluoro-9α,11β-dichloro - 16 - methylene - 17α - hydroxy-19-nor-progesterone, 6α,21 - difluoro-9α,11β-dichloro-16-methylene-17α-hydroxy-19-nor-progesterone, and the like.

As illustrated in great detail hereinabove, the 16-lower alkylidene-17α-hydroxypregnanes of the composition aspect of this invention which are derived from the process aspect of this invention are useful for the preparation of therapeutically active 16-alkylidene steroids. The novel compounds arising from our process also serve as valuable precursors for 16-alkyl steroids. Depending upon the conditions employed, it is possible to obtain either the α or β configuration of the 16-alkyl group. Thus, upon hydrogenating under acidic conditions as in acetic acid and employing palladium on carbon as the catalyst, there is obtained from a 16-methylene compound the corresponding 16α-methyl steroid, whereas upon hydrogenation under basic or neutral conditions as in ethyl acetate, and in ethyl acetate containing triethylamine, and employing palladium on carbon, there is formed predominantly the 16β-alkyl isomer. Thus, there can be obtained from 16-methylene-pregnane-3α,17α-diol-20-one 3-acetate upon reduction as described above the compound 16α-methyl-pregnane-3α,17α-diol-20-one 3-acetate which can be converted to dexamethasone by transformations which have been applied to analogous compounds which include introduction of a 21-hydroxy group by bromination followed by acetoxylation at C-21, then by oxidation with chromium trioxide in acetone-sulfuric acid, to the 3-keto analog, dibromination at C-2 and C-4 followed by dihydrobromination with dimethylformamide, yielding 16α-methyl-1,4-pregnadiene-17α,21-diol-3,20-dione 21-acetate. This compound, in the form of the 21-free alcohol, is 11α-hydroxylated microbiologically in known manner and then converted via the 9,11-ene and 9,11-oxide, followed by treatment with hydrogen fluoride, to dexamethasone.

The following examples are illustrative of the procedures employed in preparing the compounds of this invention but are not to be construed as limiting the scope thereof, the scope of our invention being limited only by the appended claims.

EXAMPLE 1

16β-methyl-16α,17α-oxido-5-pregnen-3β-ol-20-one

To a solution of 32 ml. of 50% aqueous sodium hydroxide in 125 ml. of water is added a solution of 164 g. of 16-methyl-5,16-pregnadiene-3β-ol-20-one in 500 ml. of chloroform and 1200 ml. of methanol. The mixture is cooled to below 25° C. and then there is added with stirring 225 ml. of 35% hydrogen peroxide. Stirring is continued for 48 hours and the mixture is acidified with acetic acid. A saturated solution of sodium sulfide is added until any excess peroxide is destroyed as determined by the iodide-starch test. The mixture is then steam distilled and the residue filtered. The solid is recrystallized from acetone to give 16β-methyl-16α,17α-oxido-5-pregnen-3β-ol-20-one, M.P. 188° C. $[\alpha]_D^{25}$—20° (1% in dioxane).

By employing the above procedure and utilizing as starting compounds, 16-methyl-16-pregnen-3α-ol-20-one and 16-methyl-16-allopregnen-3β-ol-20-one (which can be prepared from the appropriate starting compounds pursuant to the procedures described in Belgian Pat. No. 577,030 (published September 1959), in J. Am. Chem. Soc. (Slates et al.) 81, 5472 (September 1959) and in J. Am. Chem. Soc. (Mueller and Riegel) 76, 3086 (1954)) there are prepared respectively, the compounds 16β-methyl - 16α,17α - oxido-pregnan-3α-ol-20-one and 16β-methyl-16α,17α-oxidoallopregnan-3β-ol-20-one.

EXAMPLE 2

16β-methyl-16α,17α-oxido-5-pregnen-3β-ol-20-one 3-acetate

To a solution of 167 g. of 16β-methyl-16,17-oxido-5-pregnen-3β-ol-20-one in 500 ml. of dry pyridine is added 167 ml. of acetic anhydride. The mixture is then heated at 60° C. for 10 hours, cooled to room temperature and precipitated by the addition of 3000 ml. of ice water. The crude product is collected by filtration, washed well with ice water until free of pyridine, dried and crystallized from acetone to give 16β-methyl-16α,17α-oxido-5-pregnen-3β-ol-20-one 3-acetate, M.P. 180–182° C. $[\alpha]_D^{25}$ —16.7 (1%, dioxane).

In a similar fashion by employing 16β-methyl-16α,17α-oxidopregnan-3α-ol-20-one and 16β-methyl-16α,17α-oxidoallopregnan-3β-ol-20-one, there are prepared respectively 16β - methyl - 16α,17α-oxidopregnan-3α-ol-20-one 3-acetate and 16β-methyl-16α,17α-oxidoallopregnan-3β-ol-20-one 3-acetate.

EXAMPLE 3

16-methylene-5-pregnene-3β,17α-diol-20-one 3-acetate

To a solution of 110 g. of 16β-methyl-16α,17α-oxido-5-pregnen-3β-ol-20-one 3-acetate in 2420 ml. of acetic acid is added 2.42 g. of hydrogen bromide. The mixture is agitated for 5 minutes at 30° C. and then filtered. The solid thus collected is washed with 80% acetic acid and dried. The mother liquor is poured into 10 parts of water and filtered, washing the solid with ice water until neutral. This solid is then combined with the solid obtained above and recrystallized from acetone to yield 16-methylene-5-pregnene-3β,17α-diol-20-one 3-acetate, M.P. 200° C. $[\alpha]_D^{25}$ —109.5 (1%, dioxane).

In a similar manner, by subjecting 16β-methyl-16α,17α-oxidopregnan-3α-ol-20-one 3-acetate and 16β-methyl-16α,17α-oxidoallopregnan-3β-ol-20-one 3-acetate to the procedure recited herein, there are prepared respectively 16-methylenepregnane-3α,17α-diol-20-one 3-acetate and 16-methyleneallopregnane-3β,17α-diol-20-one 3-acetate.

Likewise, by employing 16β-methyl-16α,17α-oxido-5-pregnen-3β-ol-20-one as the starting material in the procedure of this example there is obtained 16-methylene-5-pregnene-3β,17α-diol-20-one.

Alternatively, other acids may be substituted for hydrogen bromide. Thus, for example, equivalent amounts of hydrogen chloride, trifluoroacetic acid, or p-toluenesulfonic acid may be employed with substantially the same results.

EXAMPLE 4

16-ethylidene-5-pregnene-3β,17α-diol-20-one 3-acetate

By utilizing 16-ethyl-5,16-pregnadien-3β-ol-20-one as the starting compound in the procedure of Example 1, there is obtained 16β-ethyl-16α,17α-oxido-5-pregnen-3β-ol-20-one which, when reacted with acetic anhydride in pyridine according to the procedure of Example 2, is esterified at C-3 to give 16β-ethyl-16α,17α-oxido-5-pregnen-3β-ol-20-one 3-acetate. Reaction of the latter compound (i.e. the 3-acetate) with hydrogen bromide in acetic acid in a manner similar to that described in Example 3 yields 16-ethylidene-5-pregnene-3β,17α-diol-20-one 3-acetate.

It will be evident that the 3-esters described above can be hydrolyzed in known manner, as with sodium carbonate or sodium hydroxide, to obtain the corresponding 3-hydroxy compound, e.g. 16-ethylidene-5-pregnene-3β,17α-diol-20-one. Similarly, the 3-acetate esters prepared in Example 3 are hydrolyzed to obtain 16-methylene-5-pregnene-3β,17α-diol-20-one, 16-methylene-pregnane-3α,17α-diol-20-one and 16-methylene-5α-pregnane-3β,17α-diol-20-one, respectively.

By employing as starting compound, the 3-keto- and the 3-keto-4-pregnene analogs of the starting compounds of Examples 1–4, there is obtained the corresponding 3-keto-16-alkylidene-17α-hydroxy- and the 3-keto-16-alkylidene-17α-hydroxy-4-pregnene analogs of the compounds prepared in each of Examples 1–4. For example, reaction of 16-methyl-4,16-pregnadiene-3,20-dione and 16-ethyl-4,16-pregnadiene-3,20-dione with alkaline hydrogen peroxide according to the procedure of Example 1 gives respectively, 16β-methyl-16α,17α-oxidoprogesterone and 16β-ethyl-16α,17α-oxidoprogesterone. Reaction of each of the foregoing with hydrogen bromide in acetic acid according to the procedure of Example 3 yields respectively, 16-methylene-4-pregnene-17α-ol-3,20-dione and 16-ethylidene-4-pregnen-17α-ol-3,20-dione. An example of the use of a saturated 3-keto starting compound follows:

EXAMPLE 5

16-methylene-17α-hydroxypregnane-3,20-dione (A) 16β-methyl-16α,17α-oxidopregnan-3β-ol-20-one.— To a solution of 60 ml. of 50% aqueous sodium hydroxide in 220 ml. of water is added a solution of 335 g. of 16-methyl-16-pregnen-3β-ol-20-one in 900 ml. of chloroform and 2200 ml. of methanol. The mixture is cooled to below 25° C. and then there is added with stirring 425 ml. of 35% hydrogen peroxide. Stirring is continued for 48 hours and the mixture is acidified with acetic acid. A saturated solution of sodium sulfite is added until any excess peroxide is destroyed as determined by the iodide-starch test. The mixture is then steam distilled and the residue filtered. The solid is recrystallized from acetone to give 16β-methyl-16α,17α-oxidopregnan-3β-ol-20-one.

(B) 16β-methyl-16α,17α-oxidopregnane-3,20-dione.— 10 grams of 16β-methyl-16α,17α-oxidopregnan-3β-ol-20-one are dissolved in 750 ml. of toluene. About 100 ml. of toluene is distilled, then 150 ml. of freshly distilled cyclohexanone is added to the solution, followed by the dropwise addition over a five minute period of a solution of 5 g. of aluminum isopropoxide in dry toluene. The solution is refluxed for one hour under a Dean-Stark trap. 60 ml. of water is added cautiously and then the water is removed by azeotropic distillation. The solution is cooled, filtered and the filtrate is steam distilled. The suspension left after steam distillation is filtered. The solid residue is washed with water, dried and crystallized from isopropyl ether to give 16β-methyl-16α,17α-oxidopregnane-3,20-dione.

(C) 16-methylene-17α-hydroxypregnane-3,20-dione.— A solution of 14 g. of 16β-methyl-16α,17α-oxidopregnane-3,20-dione in 350 ml. of acetic acid is warmed to 35° C. A 10% solution of hydrobromic acid in acetic acid (3.5 ml.) is added. The reaction mixture is maintained at approximately 35–45° C. for 20 minutes, then is diluted with 4 l. of water. A precipitate results which is filtered, washed with water, dried at 60° C. and crystallized from acetone to give 16-methylene-17α-hydroxypregnane-3,20-dione.

The analogous 1-pregnene compounds yield, for example, the 1-pregnene-3X-16,17-oxido-16β-alkyl-20-ones which in turn give the 1-pregnene-3X-16-alkylidene-20-ones, X being keto, hydroxyl or acyl. In the case of the 3-keto-pregnenes, when utilized as intermediates in the preparation of 16-lower-alkyl-17α-hydroxy compounds, we prefer to protect the keto group as by conversion to an ethylene glycol ketal group prior to reduction of the 16-alkylidene group to alkyl.

EXAMPLE 6

16-methylene-17α-hydroxyprogesterone (A) 16β-methyl-16α,17α-oxidoprogesterone.—25 grams of 16β-methyl-16α,17α-oxido-5-pregnen-3β-ol-20-one are dissolved in 1725 ml. of toluene. About 175 ml. of toluene is distilled, then 375 ml. of freshly distilled cyclohexanone is added to the solution, followed by the dropwise addition over a five minute period of a solution of 12.5 g. of aluminum isopropoxide in dry toluene. The solution is refluxed for one hour under a Dean-Stark trap. 60 ml. of water is added cautiously and then the water is azeotroped off. The solution is cooled, filtered and the filtrate steam distilled. The suspension left after steam distillation is filtered. The solid residue is washed with water, dried and crystallized from isopropyl ether to give 16β-methyl-16α,17α-oxidoprogesterone, λETOH 240 mμ (ε 16,760); M.P. 160–163° C.; $[\alpha]_D$ +118.0 (dioxane).

(B) 16-methylene-17α-hydroxyprogesterone.—A solution of 6.93 g. of 16β-methyl-16α,17α-oxidoprogesterone in 170 ml. of acetic acid is warmed to 35° C. A 10% solution of hydrobromic acid in acetic acid (1.7 ml.) is added. The reaction mixture is maintained at approximately 35–45° C. for 20 minutes, then is diluted with 2 l. of water. A precipitate results which is filtered, washed with water, dried at 60° C. and crystallized from acetone to give 16-methylene-17α-hydroxyprogesterone, λETOH 240 mμ (ε 16,600); M.P. 219–222° C. $[\alpha]_D$ +17 (dioxane).

EXAMPLE 7

16-methylene-17α-hydroxyprogesterone 17-acetate

One gram of 16-methylene-17α-hydroxyprogesterone is dissolved in 10 ml. of acetic acid. Argon gas is bubbled through the acetic acid solution and then, under anhydrous conditions, 1.99 ml. of trifluoroacetic anhydride is added. The solution is heated at 80–95° C. for 55 minutes, then is poured into ice-water. The resultant mixture is extracted with methylene chloride. The organic extracts are combined and, in turn, are extracted with 3% aqueous potassium carbonate and finally with water. The methylene chloride solution is dried over magnesium sulfate, filtered and evaporated to a residue which, upon trituration with acetone-isopropyl ether yields a solid, which is filtered and dried to give 16-methylene-17α-hydroxyprogesterone 17-acetate, λETOH 240 mμ (ε 17,300); M.P. 227–227.5° C.; [α]$_D$ − 51.8 (dioxane).

In the above procedure, by substituting other lower alkanoic acids such as caproic and propionic acids for acetic acid, there is obtained the corresponding 17-lower alkanoate ester, i.e. the 17-caproate and 17-propionate, respectively of 16-methylene-17α-hydroxyprogesterone.

Alternatively, the compound of this example is prepared in the following manner. 8.8 grams of 16β-methyl-16α,17α-oxidoprogesterone are dissolved in 88 ml. of acetic acid. Argon gas is gently bubbled through the solution to displace the air, then 17.5 ml. of trifluoroacetic anhydride is added. The resulting dark brown solution is warmed at 30–40° C. for about one hour under anhydrous conditions. The reaction mixture is then diluted with water and extracted with methylene chloride. The extracts are combined, washed with 3% aqueous sodium carbonate, then with water and is evaporated to a residue which is crystallized from acetone-ether to give 16-methylene-17α-hydroxyprogesterone 17-acetate.

EXAMPLE 8

16-methylene-17α-hydroxy-1,4-pregnadiene-3,20-dione 17-acetate

A solution of 1 g. of yeast extract (Difco) in 1 liter of tap water, the pH of which is adjusted to 6.9, is distributed among ten 300 ml. Erlenmeyer flasks and to each flask is added a loopful, 2 ml., of *Corynebacterium simplex* (A.T.C.C. 6946). The resulting suspensions are incubated at 30° C. on a shaking machine for 18 hours. One-half gram of 16-methylene-17α-hydroxyprogesterone is dissolved in 20 ml. of acetone and the resulting solution is distributed equally among the ten flasks containing the 18 hours growth of *Corynebacterium simplex*. The culture containing the progesterone is then incubated at 30° C. for 24 hours. At the end of 24 hours, the contents of the flasks are combined and extracted with a total of 3 liters of chloroform. The crude chloroform extract from the transformation is then concentrated to a residue which is crystallized from acetonehexane to give 16-methylene-17α-hydroxy-1,4-pregnadiene-3,20-dione.

In the manner described in Example 7, 1 g. of 16-methylene-17α-hydroxy-1,4-pregnadiene-3,20-dione is reacted with acetic acid and trifluoroacetic anhydride and purified in the described manner to give 16-methylene-17α-hydroxy-1,4-pregnadiene-3,20-dione 17-acetate.

EXAMPLE 9

6α-methyl-16-methylene-17α-hydroxyprogesterone (A) 6-methyl- 16,17 -pyrazolino-5-pregnen-3β-ol-20-one 3-acetate.—A solution of 3.5 g. of 6-methyl-5,16-pregnadien-3β-ol-20-one 3-acetate in 5 ml. of methylene chloride is added to a solution of approximately 1 g. of diazomethane in 65 ml. of ether which had been cooled to approximately −10° C. The mixture is kept at 0° C. for 5 hours, then allowed to warm up to room temperature. The excess diazomethane is displaced with a nitrogen stream and the reaction solution is evaporated to a residue which is crystallized from acetone-ether to give 6-methyl-16,17-pyrazolino-5-pregnen- 3β -ol-20-one 3-acetate.

(B) 6,16-dimethyl-5,16-pregnadien-3β-ol-20-one 3-acetate.—The 16,17-pyrazolino prepared in Example 9A is heated under reduced pressure at approximately 10 mm. vacuum until liquifaction occurs. The temperature and pressure is maintained until the evolution of nitrogen has ceased. The residual oil is then cooled to room temperature and crystallized from ether to give 6,16-dimethyl-5,16-pregnadien-3β-ol-20-one 3-acetate.

(C) 6,16β-dimethyl-16α,17α-oxido- 5 -pregnen-3β-ol-20-one.—To a solution of 1.5 g. of 6,16-dimethyl-5,16-pregnadien-3β-ol-20-one 3-acetate in 95 ml. of methanol at approximately 15° C. is added 3 ml. of 4 N sodium hydroxide followed by 6 ml. of 30% hydrogen peroxide solution. The mixture is allowed to remain at approximately 5° C. for 18 hours. The reaction solution is poured into 500 ml. of water and the resulting precipitate is filtered, dried and crystallized from acetone-hexane to give 6,16β-dimethyl - 16α,17α - oxido-5-pregnen-3β-ol-20-one.

(D) 6α,16β-dimethyl-16α,17α-oxidoprogesterone. — 6,16β - dimethyl - 16α,17α - oxido-5-pregnen-3β-ol-20-one (0.5 g.) is dissolved in 35 ml. of toluene. After collecting by distillation approximately 4 ml. of toluene, 7.5 ml. of freshly distilled cyclohexanone is added, followed by the dropwise addition of a solution of 0.25 g. of aluminum isopropoxide in dry toluene. The solution is refluxed for 1 hour under a Dean-Stark trap, then 1.2 ml. of water is added cautiously, and then the water azeotroped off. The solution is cooled, filtered and the toluene and cyclohexanone are removed by steam distillation. The resulting solid is filtered, washed with water, dried and crystallized from isopropyl ether to give 6α,16β-dimethyl-16α,17α-oxidoprogesterone.

(E) 6α - methyl - 16 - methylene - 17α - hydroxyprogesterone.—In a manner similar to that described in Example 3, 6α,16β-dimethyl-16α,17α-oxidoprogesterone is reacted with a 10% solution of hydrobromic acid in acetic acid and the resultant product isolated and purified as described to give 6α-methyl-16-methylene-17α-hydroxy progesterone.

The 17-acetate ester of the compound of this example is prepared from 6α,16β-dimethyl-16α,17α-oxidoprogesterone by the alternate procedure of Example 7 to give 6α-methyl-16 - methylene-17α - hydroxyprogesterone 17-acetate.

EXAMPLE 10

16-methyl-5,9(11),16-pregnatrien-3β-ol-20-one 3-acetate (A) 3β,11α - dihydroxy - 5,16 - pregnadien - 20 - one 3-acetate.—To a solution of 1.1 g. of 3β,11α-dihydroxy-5,16-pregnadien-20-one in 10 ml. of dry pyridine is added 0.33 g. of acetic anhydride and the reaction mixture is allowed to remain at room temperature for 3 hours. Water is added and a precipitate results which is filtered, dried, and then crystallized from methanol to give 3β,11α-dihydroxy-5,16-pregnadien-20-one 3-acetate.

(B) 3β,11α - dihydroxy - 5,16 - pregnadien - 20 - one 3-acetate 11-p-toluenesulfonate.—A solution of 2.5 g. of 3β,11α-dihydroxy-5,16-pregnadien-20-one 3-acetate in 10 ml. of chloroform and 14 ml. of dry pyridine is chilled in an ice-bath, then 2.5 g. of p-toluene-sulfonyl chloride is added in small portions. The reaction mixture is stirred in the cold for 80 minutes, then allowed to warm to and remain at room temperature for 18 hours. The reaction mixture is then poured ice-water, stirred and extracted with chloroform. The organic extracts are combined, washed with water, dried over magnesium sulfate, filtered and concentrated in vacuo to a residue which is crystallized from methanol to give 3β,11α-dihydroxy-5,16-pregnadien-20-one 3-acetate 11-p-toluenesulfonate.

(C) 3β - hydroxy - 5,9(11),16 - pregnatrien - 20 - one 3-acetate.—To a solution of 1.9 g. of anhydrous sodium acetate in 20 ml. of acetic acid, at about 105° C., is added 1.25 g. of 3β,11α-dihydroxy-5,16-pregnadien-20-one 3-acetate 11-p-toluene sulfonate. The solution is refluxed for 40 minutes, then chilled in ice, and diluted with cold water. The resultant precipitate is filtered, washed with water, dried and crystallized from acetone-hexane to give 3β-hydroxy-5,9(11),16-pregnatrien-20-one 3-acetate.

(D) 3β - hydroxy - 16,17 - pyrazolino - 5,9(11) - pregnadien-20-one 3-acetate.—In the manner of Example 9A, 3β-hydroxy-5,9(11),16-pregnatrien-20-one 3-acetate is reacted with diazomethane. The resultant product is isolated in the described manner and crystallized from acetone-hexane to give 3β-hydroxy-16,17-pyrazolino-5,9(11)-pregnadien-20-one 3-acetate.

(E) 3β - hydroxy - 16 - methyl - 5,9(11),16 - pregnatrien-20-one 3-acetate.—The 16,17-pyrazolino-5,9(11)-pregnadiene of above Example 10D is heated under reduced pressure in the manner of Example 9B. The resultant product is isolated in the described manner and crystallized from ethyl ether to give 3β-hydroxy-16-methyl-5,9(11),16-pregnatrien-20-one 3-acetate.

EXAMPLE 11

3β,17α-dihydroxy-16-methylene-5,9(11)-pregnadien-20-one (A) 3β - hydroxy - 16β - methyl - 16α,17α - oxido-5,9(11) - pregnadien - 20 - one.—3β - hydroxy - 16-methyl-5,9(11),16-pregnatrien-20-one 3-acetate is reacted with alkaline hydrogen peroxide in the manner of Example 9C and the resultant product isolated in the described manner and crystallized from acetone-hexane to give 3β-hydroxy-16β - methyl-16α,17α - oxido-5,9(11)-pregnadien-20-one.

(B) 3β,17α - dihydroxy - 16 - methylene - 5,9(11)-pregnadien-20-one.—In the manner of Example 3, 3β-hydroxy - 16β - methyl - 16α,17α - oxido - 5,9(11)-pregnadien-20-one is reacted with acetic acid and hydrobromic acid. The resultant product is isolated as described and crystallized from acetone to give 3β,17α-dihydroxy-16-methylene-5,9(11)-pregnadien-20-one.

EXAMPLE 12

16-methylene-17α-hydroxy-4,9(11)-pregnadien-3,20-dione and the 17-acetate ester (A) 16β - methyl - 16α,17α - oxido - 4,9(11) - pregnadiene - 3,20 - dione.—3β - hydroxy - 16β - methyl-16α,17α-oxido-5,9(11)-pregnadien-20-one is reacted with aluminum isopropoxide and cyclohexanone in toluene in the manner of Example 6A. The resultant product is isolated as described and crystallized from ether to give 16β-methyl-16α,17α-oxido-4,9(11)-pregnadiene-3,20-dione.

(B) 16 - methylene - 17α - hydroxy - 4,9(11) - pregnadiene-3,20-dione.—The 16α,17α-oxido-5,9(11)-pregnadiene of Example 12A is reacted with acetic acid and hydrobromic acid in the manner of Example 3. The resultant product is isolated in the described manner and crystallized from acetone-hexane to give 16-methylene-17α-hydroxyl-4,9(11)-pregnadiene-3,20-dione.

(C) 16 - methylene - 17α - hydroxy - 4,9(11) - pregnadiene - 3,20 - dione 17 - acetate.—In a manner similar to that of Example 7, 1 g. of 16-methylene-17α-hydroxy-4,9(11)-pregnadiene-3,20-dione is reacted with acetic acid and trifluoroacetic anhydride to give 17α - hydroxy - 16-methylene-4,9(11)-pregnadiene-3,20-dione 17-acetate.

EXAMPLE 13

6α-chloro-16-methylene-17α-hydroxyprogesterone and the 9(11)-dehydro analog (A) 3β,17α - dihydroxy - 16-methylene-5-pregnen-20-one.—One gram of 3β,17α - dihydroxy-16-methylene-5-pregnen-20-one 3-acetate is dissolved in 25 ml. of methanol and 5 ml. of water containing 0.2 g. of potassium bicarbonate. This solution is refluxed for ½ hour, then concentrated in vacuo. Water is added to the residue and the resultant precipitate is filtered, dried and crystallized from acetone-hexane to give 3β,17α-dihydroxy-16-methylene-5-pregnen-20-one.

(B) 3β,17α - dihydroxy - 5,6 - dichloro-16-methylene-pregnan-20-one and the 9(11)-dehydro analog thereof.—A solution containing 5.8 g. of 3β,17α - dihydroxy - 16-methylene-5-pregnen-20-one and 3.5 ml. of pyridine in 200 ml. of chloroform is cooled to −25° C. To this stirred solution is added dropwise over a 15-minute period 1.16 g. of chlorine contained in 20 ml. of carbon tetrachloride. With continued stirring, the reaction solution is allowed to warm to approximately 15° C., then washed successively with dilute hydrochloric acid, water, aqueous sodium thiosulfate, and water. The organic phase is dried over magnesium sulfate, filtered, and the filtrate evaporated to a residue which is treated with methanol to give 3β,17α-dihydroxy - 5,6 - dichloro-16-methylenepregnan-20-one.

In similar manner, react 3β,17α - dihydroxy-16-methylene-5,9(11)-pregnadien-20-one with chlorine in carbon tetrachloride and pyridine in the manner described above. Isolate the resultant product in the manner described and purify by crystallization from acetone to give 3β,17α-dihydroxy-5,6-hichloro-16-methylene-9(11)-pregnen-20-one.

(C) 5,6-dichloro - 16 - methylene - 17α-hydroxypregnane-3,20-dione and the 9(11) - dehydro analog.—To a stirred solution of 1.3 g. of 3β,17α-dihydroxy-5,6-dichloro-16-methylenepregnan-20-one in 3.0 ml. of acetic acid and 0.4 ml. of water at 10° C. is added over a 10-minute period a solution containing 0.35 g. of chromium trioxide in 1 ml. of acetic acid and 1 ml. water, followed by 0.012 ml. of concentrated sulfuric acid. The reaction mixture is stirred for 30 minutes, then diluted with water and extracted with chloroform. The combined chloroform extracts are washed with water, aqueous sodium bicarbonate and finally with water. The chloroform solution is dried and evaporated to a residue substantially of 5,6-dichloro-16 - methylene-17α-hydroxypregnane-3,20-dione which is used without further purification in the following reaction 13D.

In a manner similar to that described hereinabove, react 3β,17α - dihydroxy-5,6-dichloro-16-methylene-9(11)-pregnen-20-one with chromium trioxide in acetic acid and in the presence of sulfuric acid. Isolate the resultant product as described to give 5,6-dichloro-16-methylene-17α-hydroxy-9(11)-pregnene-3,20-dione which is used without further purification in the following procedure 13E.

(D) 6β - chloro - 16 - methylene - 17α-hydroxyprogesterone and the 9(11)-dehydro analog.—The 5,6-dichloro-3-keto-pregnane of Example 13C (1.9 g.) is refluxed in 85.5 ml. ethanol in the presence of 2.05 g. of anhydrous sodium acetate for 2 hours. The reaction solution is evaporated to a residue to which water is added. A solid separates which is filtered, dried over magnesium sulfate, and crystallized from acetone-hexane to give 6β-chloro-16-methylene-17α-hydroxyprogesterone.

In a similar manner, 5,6-dichloro-16-methylene-17α-hydroxy-9(11)-pregnene-3,20-dione is reacted with sodium acetate in ethanol. The resultant product is isolated as described and crystallized from ethyl acetate-hexane to give 6β - chloro-16-methylene-17α-hydroxy-4,9(11)-pregnadiene-3,20-dione.

(E) 6α - chloro - 16-methylene-17α-hydroxyprogesterone and the 9(11)-dehydro analog.—6β-chloro-16-methylene-17α-hydroxyprogesterone (150 mg.) is dissolved in 30 ml. of chloroform and the solution is cooled to −10° C. A stream of anhydrous hydrogen chloride is bubbled through the solution during a period of 2 hours while maintaining the temperature at −10° C. The chloroform solution is washed with sodium bicarbonate solution and water, then dried and evaporated to a residue. Crystallization from acetone-hexane gives 6α-chloro-16-methylene-17α-hydroxyprogesterone.

Similarly, the 6β-chloro-4,9(11)-pregnadiene of Example 13D is reacted with anhydrous hydrogen chloride in chloroform. The resultant product is isolated as described and crystallized from acetone-hexane to give 6α-chloro-16 - methylene - 17α-hydroxy-4,9(11)-pregnadiene-3,20-dione.

(F) 6α - chloro-16-methylene-17α-hydroxyprogesterone 17-acetate and the 9(11)-dehydro analog.—In a manner similar to that described in Example 7, the 17α-hydroxyprogesterones prepared in Example 13E are reacted with acetic acid and trifluoroacetic anhydride to give 6α-chloro-16 - methylene-17α-hydroxyprogesterone 17-acetate and 6α - chloro-16-methylene-17α-hydroxy-9(11)-dehydroprogesterone 17-acetate, respectively.

EXAMPLE 14

9α,11β-dichloro-16-methylene-17α-hydroxyprogesterone 17-acetate and the 6-chloro-derivative (A) To 10 g. of the 17α-hydroxy-16-methylene-4,9(11)-pregnadiene-3,20-dione 17-acetate dissolved in 35 ml. of carbon tetrachloride at 20° C., is added 2.1 ml. chlorine gas in carbon tetrachloride (111 mg. $Cl_2$/ml.) and 0.75 ml. of pyridine. The mixture is stirred at −20° C. for 20 minutes, then allowed to warm to room temperature over 40 minutes. The solution is filtered and the filtrate concentrated in vacuo to a residue which is triturated with ether. A solid results which is crystallized from acetone-hexane to give 9α,11β-dichloro-16-methylene-17α-hydroxyprogesterone 17-acetate.

Alternatively, 9α,11β - dichloro-16-methylene-17α-acetoxyprogesterone is prepared as follows:

In the manner described above, 16-methylene-17α-hydroxy - 4,9(11) - pregnadiene-3,20-dione is reacted with chlorine in carbon tetrachloride in the presence of pyridine. The resultant product is isolated as described and crystallized from acetone-hexane to give 9α,11β-dichloro-16-methylene-17α-hydroxyprogesterone, which, in turn, is reacted with acetic acid and trifluoracetic anhydride in the manner of Example 7 to give 9α,11β-dichloro-16-methylene-17α-hydroxyprogesterone 17-acetate.

(B) In a manner similar to that described in the first paragraph above, treat 6α-chloro-16-methylene-17α-acetoxy-9(11)-dehydroprogesterone with chlorine in carbon tetrachloride in the presence of pyridine. Isolate and purify the resultant product in a manner similar to that described to give 6α,9α,11β-trichloro-16-methylene-17α-acetoxyprogesterone.

EXAMPLE 15

6α-chloro-9α-bromo-11β,17α-dihydroxy-16-methyleneprogesterone 17-acetate

To a mixture of 0.2 g. of 6α-chloro-16-methylene-17α-hydroxy-4,9(11)-pregnadiene-3,20-dione 17-acetate in 20 ml. of dioxane (which has been purified by refluxing over sodium followed by distillation) and 2 ml. of water is added 0.07 g. of N-bromoaectamide and 1 ml. of 1.5 N perchloric acid. The mixture is allowed to stand for 2 hours, then a solution of 0.2 g. of sodium sulfite in 2 ml. of water is added and the mixture is extracted with methylene chloride. The organic extracts are combined, washed with water, dried over magnesium sulfate and evaporated to a residue which is crystallized from acetone to give 6α-chloro-9α-bromo-11β,17α-dihydroxy-16-methyleneprogesterone 17-acetate.

EXAMPLE 16

6-substituted-16-methylene-17α-acetoxy-6-dehydroprogesterone

Two grams of 6α-methyl-16-methylene-17α-hydroxyprogesterone 17-acetate and 5 g. of chloranil in 60 ml. of ethyl acetate and 15 ml. of acetic acid are heated at reflux temperature for 13 hours under an atmosphere of nitrogen. The reaction mixture is evaporated to a residue and extracted with ethyl acetate. The organic extracts are combined with cold 7% aqueous sodium hydroxide, then with water, dried over magnesium sulfate, filtered and evaporated to a residue which is crystallized from acetone-hexane to give 6-methyl-16-methylene-17α-hydroxy-4,6-pregnadiene-3,20-dione 17-acetate.

In similar manner, 6α-chloro-16-methylene-17α-hydroxyprogesterone 17-acetate is reacted with chloranil in ethyl acetate and acetic acid. The resultant product is isolated as described and crystallized from ethylene chloride to give 6-chloro-16-methylene-17α-hydroxy-4,6-pregnadiene-3,20-dione 17-acetate.

EXAMPLE 17

16-butylidene-17α-hydroxyprogesterone 17-acetate and 16-ethylidene-17α-hydroxy-4,9(11) - pregnadiene-3,20-dione 17-acetate (A) 16α-alkyl-5-pregnen-3β-ol-20-one 3-acetate and the 9(11)-dehydro analog.—3.6 grams of 5,16-pregnadien-3β-ol-20-one 3-acetate in 20 ml. of dry toluene is added to a Grignard reagent prepared from 10.5 g. of butyl iodide and 1.8 g. of magnesium in 40 ml. of ether, and containing 200 mg. of cupric chloride. The reaction mixture is distilled until a vapor temperature of 100° C. is reached. The distillation is then stopped, and the reaction temperature maintained at 100° C. for 5 hours. The mixture is cooled, poured into ice and an aqueous solution of ammonium chloride, and the solvent layers separated. The organic layer is distilled in vacuo to a residue which is chromatographed on Florisil. Eluates ranging from 15% ether-in-hexane to 35% ether-in-hexane are collected and evaporated. The resultant residue is dissolved in 20 ml. of dry pyridine and 3 ml. of acetic anhydride and allowed to stand at room temperature for 5 hours. Water is added. A precipitate results which is filtered and crystallized from acetone-hexane to give 16α-n-butyl-5-pregnen-3β-ol-20-one 3-acetate.

In a similar manner, 5,9(11),16-pregnatrien-3β-ol-20-one 3-acetate is reacted with ethyl magnesium iodide and subsequently esterified to give 16α-ethyl-5,9(11)-pregnadien-3β-ol-20-one 3-acetate.

(B) 16α-alkyl-17α-bromo-5-pregnen - 3β-ol-20-one 3-acetate and the 9(11)-dehydro analog.—One gram of the 16α-n-butyl-5-pregnen-3β-ol-20-one 3-acetate is dissolved in 10 ml. of acetic acid and there is added 2.1 equivalents of bromine in acetic acid. When the bromine color is discharged, 0.5 g. of sodium iodide in 3 ml. water is added. The solution is warmed at 30° C. for 20 minutes, cooled and then diluted with water. A precipitate results which is filtered, washed with water, dried and crystallized from aqueous acetone to give 16α-n-butyl-17α-bromo-5-pregnen-3β-ol-20-one 3-acetate.

In a similar manner, 16α-ethyl-5,9(11)-pregnadien-3β-ol-20-one 3-acetate is reacted with 3:1 equivalents of bromine in acetic acid and the resultant product treated with 1 g. of sodium iodide and purified to give 16α-ethyl-17α-bromo-5,9(11) - pregnadien - 3β-ol-20-one 3-acetate.

(C) 16-alkyl-5,16-pregnadien - 3β-ol-20-one 3-acetate and the 9(11)-dehydro analog.—One gram of the 16α-n-butyl-17α-bromo-5-pregnen - 3β-ol-20-one 3-acetate is refluxed in 20 ml. of dimethylformamide under a nitrogen atmosphere for 3 hours. The reaction mixture is cooled, then poured into ice-water containing excess hydrochloric acid, and extracted with methylene chloride. The extracts are combined, washed with water, dried over magnesium sulfate and evaporated to a residue which is chromatographed over Florisil. Eluates ranging from 10% ether-in-hexane to 30% ether-in-hexane are combined and evaporated to a residue which is crystallized from methylene chloride-hexane to give 16-n-butyl-5,16-pregnadien-3β-ol-20-one 3-acetate.

Similarly, 16α-ethyl-17α - bromo-5,9(11)-pregnadien-3β-ol-20-one 3-acetate is reacted with dimethylformamide to give 16-ethyl-5,9(11),16-pregnatrien-3β-ol-20-one 3-acetate.

(D) 16β-n-butyl-16α,17α-oxido - 5 - pregnen-3β-ol-20-one and 16β-ethyl-16α,17α-oxido-5,9(11)-pregnadien-3β-ol-20-one.—In a manner similar to that described in Example 9C, 16-n-butyl-5,16-pregnadien-3β-ol-20-one 3-acetate is reacted with hydrogen peroxide in an alkaline solution. The resultant product is isolated and purified as described to give 16β-n-butyl-16α,17α-oxido-5-pregnen-3β-ol-20-one.

Similarly, 16-ethyl-5,9(11),16 - pregnatrien-3β-ol-20-one 3-acetate is reacted with alkaline hydrogen peroxide in the manner of Example 9C to give 16β-ethyl-16α,17α-oxido-5,9(11)-pregnadien-3β-ol-20-one.

(E) 16β-n-butyl-16α,17α-oxidoprogesterone and 16β-ethyl-16α,17α-oxido-9(11) - dehydroprogesterone.—In a manner similar to that described in Example 5B, 16β-n-butyl-16α,17α-oxido - 5 - pregnen-3β-ol-20-one is reacted with aluminum isopropoxide in the presence of cyclohexanone to give 16β-n-butyl-16α,17α-oxidoprogesterone.

Similarly, 16β-ethyl-16α-17α-oxido-5,9(11)-pregnadien-3β-ol-20-one is reacted with aluminum isopropoxide in the presence of cyclohexanone to give 16β-ethyl-16α,17α-oxido-4,9(11)-pregnadiene-3,20-dione.

(F) 16-butylidene - 17α - hydroxyprogesterone and 16-ethylidene-17α-hydroxy - 9(11) - dehydroprogesterone.—In a manner similar to that described in Example 6B, each of 16β-n-butyl-16α,17α-oxidoprogesterone and 16β-ethyl-16α,17α-oxido-4,9(11)-pregnadiene-3,20-dione is reacted with hydrobromic acid in acetic acid to give 16-butylidene-17α-hydroxyprogesterone and 16-ethylidene-17α-hydroxy-9(11)-dehydroprogesterone, respectively.

(G) 16-butylidene-17α - hydroxyprogesterone 17-acetate and 16 - ethylidene - 17α - hydroxy-9(11)-dehydroprogesterone 17-acetate.—In the manner of Example 7, each of 16 - butylidene-17α-hydroxyprogesterone and 16-ethylidene-17α-hydroxy-9(11)-dehydroprogesterone is reacted with acetic acid and trifluoroacetic anhydride to give 16-butylidene-17α-hydroxyprogesterone 17-acetate and 16-ethylidene-17α-hydroxy-9(11)-dehydroprogesterone 17-acetate, respectively.

EXAMPLE 18

16-methylene-17α-hydroxy-21-fluoroprogesterone and the 17-acetate ester thereof (A) 16-methylene - 17α - hydroxy - 21 - iodoprogesterone.—To a solution of 0.5 g. of 16-methylene-17α-hydroxyprogesterone in 5.6 ml. of tetrahydrofurane and 3.4 ml. of methanol add 0.75 g. of calcium oxide (finely ground) and 0.75 g. of iodine. The initial dark brown color slowly changes to a pale yellow over a 35 minute period. Allow the reaction solution to stand an additional hour then dilute with methylene chloride. Filter and then wash the filtrate successively with a solution of 3% sodium iodide then 4% sodium thiosulfate and with water. Evaporate the organic solution to a residue comprising 16-methylene 17α - hydroxy-21-iodoprogesterone. Purify by crystallization from acetone-ether.

In a similar manner, treat each of the following with iodine and calcium oxide:

6α-methyl-16-methylene-17α-hydroxyprogesterone,
16β-methyl-16α,17α-oxidoprogesterone,
9α,11β-dichloro-16-methylene-17α-hydroxyprogesterone,
6α,9α,11β-trichloro-16-methylene-17α-hydroxyprogesterone, and
6α,methyl-9α-fluoro-11β-hydroxy-16-methylene-17α-acetoxyprogesterone.

Isolate and purify the respective resultant products in a manner similar to that described above to obtain, respectively, 6α-methyl-16-methylene-17α-hydroxy-21-iodoprogesterone,
16β-methyl-16α,17α-oxido-21-iodoprogesterone,
9α,11β-dichloro-21-iodo-16-methylene-17α-hydroxyprogesterone,
6α,9α,11β-trichloro-21-iodo-16-methylene-17α-hydroxyprogesterone, and
6α-methyl-9α-fluoro-21-iodo-11β-hydroxy-16-methylene-17α-acetoxyprogesterone.

(B) 16 - methylene - 17α - hydroxy-21-fluoroprogesterone.—To a solution of 0.5 g. of 16-methylene-17α-hydroxy-21-iodoprogesterone in 100 ml. of acetonitrile containing 1 ml. of water add a 50% aqueous solution of 1.5 g. of silver fluoride. Warm the mixture at 30–40° C. for 4 hours then filter and pour the filtrate into water. Filter the resultant precipitate and crystallize from acetone-hexane to obtain 16-methylene-17α-hydroxy-21-fluoroprogesterone.

In a manner similar to that described above, treat with an aqueous silver fluoride solution each of the 21-iodo-16-methyleneprogesterone derivatives prepared in the second paragraph of Example 18A. Isolate and purify the resultant products in a manner similar to that described above to obtain respectively, 6α-methyl-16-methylene-17α-hydroxy-21-fluoroprogesterone,
16β-methyl-16α,17α-oxido-21-fluoroprogesterone,
9α,11β-dichloro-21-fluoro-16-methylene-17α-hydroxyprogesterone,
6α,9α,11β-trichloro-21-fluoro-16-methylene-17α-hydroxyprogesterone, and
6α-methyl-9α,21-difluoro-11β-hydroxy-16-methylene-17α-acetoxyprogesterone.

(C) 16 - methylene - 17α - acetoxy-21-fluoroprogesterone.—In a manner similar to that described in Example 7 treat 16 - methylene-17α-hydroxy-21-fluoroprogesterone with acetic acid and trifluoroacetic anhydride to yield 16-methylene-17α-acetoxy-21-fluoroprogesterone.

In a similar manner treat each of the 17α-hydroxy compounds prepared in Example 18A and in the second paragraph of 18B above with acetic acid and trifluoro acetic anhydride to obtain, respectively, 6α-methyl-16-methylene-17α-acetoxyprogesterone,
9α,11β-dichloro-16-methylene-17α-acetoxyprogesterone, and
6α,9α,11β-trichloro-16-methylene-17α-acetoxyprogesterone.

EXAMPLE 19

6α-methyl-16-methylene-17α-hydroxy-4,9-(11)-pregnadiene-3,20-dione and the 17α-acetate ester thereof (A) 6α-methyl - 11α,17α - dihydroxy - 16 - methyleneprogesterone.—6α-methyl-16 - methylene - 17α - hydroxyprogesterone is microbiologically hydroxylated as follows. A culture of *Rhizopus nigicans* (A.T.C.C. 6227b) is maintained on 1% yeast extract, 1% cerelose agar at 28° C. Ten 300 ml. Erlenmeyer flasks each containing 100 ml. aliquots of the following sterile medium: 20 g. cerelose, 5 g. protease peptone No. 3, 5 g. soybean meal, 5 g. sodium chloride, 5 g. mono-potassium diacid phosphate and 3 g. yeast extract in sufficient water to provide a liter of solution and adjusted to pH 6.8 are inoculated with a spore suspension of *Rhizopus nigicans* from the agar slants and incubated on a shaker at 280 r.p.m. at 28° C. From 24–48 hours after inoculation, 25 mg. of 6α-methyl-17α - hydroxy-16 - methyleneprogesterone in 100 ml. of methanol are added to each flask, and shaken at about 28° C. for a period of one to two days. The flasks are removed from the shaker when the conversion to the 11α-hydroxy steroid is completed, as indicated by a paper chromatography technique which is outlined by Bush, Journal of Biochemistry, 50, 370 (1952) and modified by Shull, "Paper Chromatograph of Steroid Fermentation Products," 126th Meeting of the American Chemical Society, Sept. 12–17, 1954, New York, N.Y., section 9A, paper No. 24. The contents of the flasks are combined and extracted with methylene chloride. The extracts are dried over sodium sulfate, filtered, and evaporated to a residue which is crystallized from acetone-hexane to give 6α-methyl-11α, 17α-dihydroxy-16-methyleneprogesterone.

(B) 6α-methyl-11α, 17α-dihydroxy-16-methylene progesterone 11 - p - toulenesulfonate.—In the manner described in Example 10B, 6α-methyl-11α,17α-dihydroxy-16-methyleneprogesterone is reacted with p-toluenesulfonyl chloride and pyridine in chloroform. The resultant product is isolated as described and crystallized from ethanol to give 6α-methyl-11α,17α-dihydroxy-16 - methylene-progesterone 11-p-toluenesulfonate.

(C) 6α-methyl-16-methylene-17*a*-hydroxy - 4,9 - (11)- pregnadiene-3,20-dione.—In the manner of Example 10C 6α-methyl-11α,17α-dihydroxy-16 - methyleneprogesterone 11-p-toluenesulfonate is reacted with sodium acetate in acetic acid. The resultant product is isolated as described and crystallized from acetone-hexane to give 6α-methyl-16-methylene-17α-hydroxy - 4,9(11)-pregnadiene - 3,20 - dione.

(D) 6α-methyl-16-methylene - 17α - acetoxy - 4,9(11)-pregnadiene-3,20-dione.—In a manner similar to that described in Example 7, the 17α-hydroxy-4,9(11)-pregnadiene of Example 19C is reacted with acetic acid and trifluoroacetic anhydride to give 6α-methyl-16-methylene-17α-hydroxy-4,9(11)-pregnadiene-3,20-dione 17-acetate.

By substituting other lower alkanoic acids such as caproic and valeric for acetic acid in the above procedure, the corresponding 17-lower alkanoates are obtained, i.e. 6α-methyl-16-methylene-17α-hydroxy - 4,9(11) - pregnadiene-3,20-dione caproate and 6α-methyl-16-methylene-17α-hydroxy-4,9(11)-pregnadiene-3,20-dione-17valerate.

EXAMPLE 20

9α,11β-dichloro-16-ethylidene-17α-acetoxyprogesterone

To a solution of 1.0 g. of 17α-hydroxy-16-ethylidene-4,9(11)-pregnadiene-3,20-dione 17-acetate and 4.0 g. of lithium chloride in 50 ml. of glacial acetic acid cooled to 10° C. is added 250 mg. of hydrogen chloride in 10 ml. of tetrahydrofuran followed by 0.5 g. of 93% N-chlorosuccinimide. The solution is stirred in the dark at room temperature for 20 minutes and then is poured into ice-water with stirring. A yellow precipitate separates, which is filtered, washed with water, triturated with ether and crystallized from acetone-hexane to give 9α,11β-dichloro-16-methylene-17α-hydroxyprogesterone 17-acetate.

In a similar manner, 6α-methyl - 16 - methylene - 17α - acetoxy-4,9(11)-pregnadiene-3,20-dione is reacted with N-chlorosuccinimide, hydrogen chloride and lithium chloride and the resultant product isolated and purified in a manner similar to that described above to give 6α-methyl-9α-11β-dichloro-16-methylene-17α-acetoxyprogesterone.

EXAMPLE 21

9α-halogeno-11-hydroxy-16-methylene-17a-acetoxyprogesterone and the 6α-methyl analog thereof (A) 9α-bromo-1β-hydroxy-16-methylene-17α - acetoxyprogesterone and the 6α-methyl analog thereof.—In a manner similar to that described in Example 15, treat each of the following with N-bromoacetamide and perchloric acid in aqueous dioxane:

6α-methyl-16-methylene-17α-hydroxy-4,9(11)-pregnadiene-3,20-dione
16-methylene-17α-hydroxy-4,9(11-pregnadiene-3,20-dione 17-acetate, and
16-methylene-17α-hydroxy-4,9(11)-pregnadiene-3,20-dione.

Isolate and purify the respective resultant products in a manner similar to that described to obtain, respectively:

6α-methyl-9α-bromo-11β-17α-dihydroxy-16-methyleneprogesterone,
9α-bromo-18β,17α-dihydroxy-16-methyleneprogesterone 17-acetate, and
9α-bromo-11β-17α-dihydroxy-16-methyleneprogesterone.

(B) 6α - methyl - 9β,11β - oxido-16-methylene-17α-hydroxyprogesterone 17-acetate.—To 0.3 g. 6α-methyl-9α-bromo - 11β,17α - dihydroxy - 16 - methyleneprogesterone 17-acetate in 30 ml. of acetone is added 0.3 g. of potassium acetate. The reaction mixture is refluxed for 6 hours, then the acetone is distilled. Water is added to the resultant residue. A solid separates which is filtered and crystallized from methanol-water to give 6α-methyl-9β,11β-oxido-16-methylene-17α-hydroxyprogesterone 17-acetate.

In a similar manner, treat each of the following with potassium acetate in acetone:

9α-bromo-11β-hydroxy-16-methylene-17α-acetoxyprogesterone,
9α-bromo-11β,17α-dihydroxy-16-methylene progesterone, and
6α-chloro-9α-bromo-11β-hydroxy-16-methylene-17α-acetoxyprogesterone.

Isolate and purify the resultant products in the manner described to obtain, respectively:

9β,11β-oxido-16-methylene-17α-acetoxyprogesterone,
9β,11β-oxido-16-methylene-17α-hydroxyprogesterone, and
6α-chloro-9β,11β-oxido-16-methylene-17α-acetoxyprogesterone.

(C) 6α - methyl - 9α - fluoro - 11β,17α - dihydroxy-16-methyleneprogesterone 17-acetate.—To 3.5 g. hydrogen fluoride in 20 ml. of chloroform and 0.6 ml. of tetrahydrofuran at −10° C. is added 2 g. of 6α-methyl-9β,11β-oxido-17α-hydroxy-16-methyleneprogesterone 17 - acetate. The reaction mixture is kept at −10° C. for 3 hours, then poured into aqueous sodium carbonate solution. The organic solvent layer is separated from the water and evaporated to a residue which is crystallized from methanol to give 6α-methyl-9α-fluoro-11β,17α-dihydroxy-16-methyleneprogesterone 17-acetate.

In similar manner, treat each of the 9β,11β-oxido-16-methyleneprogesterones prepared as described in the second paragraph of Example 21B with aqueous sodium carbonate solution. Isolate the resultant respective products in a manner similar to that described above to obtain, respectively:

9α-fluoro-11β-hydroxy-16-methylene-17α-acetoxyprogesterone,
9α-fluoro-11β,17α-dihydroxy-16-methyleneprogesterone, and
6α-chloro-9α-fluoro-11β-hydroxy-16-methylene-17α-acetoxyprogesterone.

(D) 6α - methyl - 9α - chloro - 11β,17α - dihydroxy-16-methyleneprogesterone 17-acetate.—A solution of 0.2 g. of 6α-methyl-9β,11β-oxido - 16-methylene - 17α - hydroxyprogesterone 17-acetate in 30 ml. of alcohol-free chloroform is saturated at 0° C. with anhydrous hydrogen chloride and the mixture allowed to stand at 0° C. for 6 hours. The solvent is distilled in vacuo from the reaction mixture leaving a residue which is crystallized from acetone to give 6α-methyl-9α-chloro-11β,17α-dihydroxy-16-methylene progesterone 17-acetate.

In similar manner, treat each of the 9β,11β-oxido-16-methyleneprogesterones as described in the second paragraph of Example 21B with anhydrous hydrogen chloride in chloroform. Isolate and purify the resultant respective products in a manner described in above Example 21D to obtain, respectively:

9α-chloro-11β-hydroxy-16-methylene-17α-acetoxyprogesterone,
9α-chloro-11β,17α-dihydroxy-16-methyleneprogesterone, and
6α,9α-dichloro-11β-hydroxy-16-methylene-17α-acetoxyprogesterone.

We claim:
1. In a process for the preparation of 16-lower alkylidene-17α-hydroxy compounds of the pregnane series, the step which comprises reacting a 16β-lower alkyl-16α,17α-oxido compound of the pregnane series having an oxygenated function of C-3 selected from the group consisting of 3β-hydroxy, 3β-hydrocarboncarboxy and 3β-hydrocarbonsulfonyloxy with a non-oxidizing strong acid in a non-aqueous solvent.

2. The process according to claim 1, wherein the lower alkyl group is methyl.

3. The process according to claim 1 wherein the 16β-lower alkyl-16α,17α-compound of the pregnane series is a member selected from the group consisting of 16α,17α-oxido-16β-methylpregnane-3β-ol-20-one and the 3-acetate ester thereof.

4. The process according to claim 1 wherein the 16β-lower alkyl-16α,17α-oxido compound of the pregnane series is a member selected from the group consisting of 16α,17α-oxido-16β-methyl-allopregnane - 3β - ol - 20 - one and the 3-acetate ester thereof.

5. The process according to claim 1, wherein the strong acid is hydrogen bromide.

6. In a process for the manufacture of 16-methylene steroids, the step which comprises reacting a member of the group consisting of 16β - methyl - 16α,17α - oxido-5-pregnen-3-ol-20-one and its 3-acetate with an acid selected from the group consisting of hydrogen chloride, hydrogen bromide, and para-toluenesulfonic acid; to effect opening up of the oxido ring with a formation of 17α-hydroxyl and a 16-methylene group.

7. In a process for the preparation of a 17α-hydroxy-16-methylene-pregn-4-ene-3,20-dione from a 16 - methyl pregnadiene having a Δ$^{16}$-double bond, the steps comprising selectively epoxidizing the Δ$^{16}$-double bond with alkaline hydrogen peroxide to give a 16α,17α-epoxide, and cleaving the 16α,17α-epoxide with hydrogen bromide.

8. In a process for the preparation of 16β-methyl-17α-hydroxy compounds of the pregnane series, the step which comprises reacting a member selected from the group consisting of 16α,17α-oxido-16β - methyl-5-pregnen-3α-ol-20-one and the 3-acetate ester thereof with a non-oxidizing strong acid in a non-aqueous solvent.

9. A compound of the group consisting of 3β,17α-dihydroxy-16-lower alkylidene-20-keto-pregnanes and pregnenes and the 3-lower alkanoates thereof.

10. A 3β-hydroxy-5-pregnene compound according to claim 9, wherein said 16-lower alkylidene is 16-methylene, said compound being 16 - methylene-5-pregnene-3β,17α-diol-20-one.

11. A 3β-lower alkanoyloxy-5-pregnene compound according to claim 9, wherein said 16-lower alkylidene is 16-methylene, said compound being 16 - methylene-5-pregnene-3β,17α-diol-20-one 3-lower alkanoate.

12. A 3β-lower alkanoyloxy-5-pregnene compound according to claim 9, wherein said 16-lower alkylidene is 16-methylene and said 3-lower alkanoate is 3-acetate, said compound being 16-methylene-5-pregnene-3β,17α-diol-20-one 3-acetate.

13. A 3β - hydroxy - pregnane compound according to claim 9, wherein said 16-lower alkylidene is 16-methylene, said compound being 16-methylenepregnane-3β,17α-diol-20-one.

14. A 3β - lower alkanoyloxy-pregnane compound according to claim 9, wherein said 16-lower alkylidene is 16-methylene, said compound being 16-methylenepregnane-3β,17α-diol-20-one 3-lower alkanoate.

15. A 3β - hydroxy - allopregnane compound according to claim 9 wherein said 16-lower alkylidene is 16-methylene, said compound being 16-methyleneallopregnane-3β,17α-diol-20-one.

16. A 3β-lower alkanoyloxy allopregnane compound according to claim 9 wherein said 16-lower alkylidene is 16 - methylene, said compound being 16 - methyleneallopregnane-3β,17α-diol-20-one 3-lower alkanoate.

17. The process according to claim 1 wherein the 16β-lower alkyl-16α-17α-oxido compound of the pregnane series is a member selected from the group consisting of 16α,17α-oxido-16β-methyl-5-pregnene - 3β - ol - 20 - one and the 3-acetate ester thereof.

18. A process according to claim 1 wherein the 16β-lower alkyl-16α,17α-compound of the pregnane series is a member selected from the group consisting of 16β-methyl-16α-17α-oxido-5-pregnene-3β-ol-20-one and the 3-acetate ester thereof and wherein the strong acid is hydrogen chloride.

19. 16β-methyl-16α,17α-oxidopregnane-3β-ol-20-one.

20. 16β-methyl-16α,17α-oxidopregnane,3,20-dione.

21. 16β-methyl-16α-17α-oxido - 49(11) - pregnadiene-3,20-dione.

References Cited

UNITED STATES PATENTS

| | | | |
|---|---|---|---|
| 3,379,745 | 4/1968 | Oliveto et al. | 260—397.47 |
| 3,345,387 | 10/1967 | Taub et al. | 260—397.45 |
| 3,296,075 | 1/1967 | Kirk et al. | 167—74 |

ELBERT L. ROBERTS, Primary Examiner

U.S. Cl. X.R.

195—51; 260—397.3, 397.4, 397.45, 397.47

PO-1050
(5/69)

UNITED STATES PATENT OFFICE
CERTIFICATE OF CORRECTION

Patent No. 3,519,619          Dated July 7, 1970

Inventor(s) E. B. Hershberg, E. P. Oliveto and R. C. Rausser

It is certified that error appears in the above-identified patent and that said Letters Patent are hereby corrected as shown below:

Column 1, line 19, "having a valuable" should read --- having valuable ---. Column 2, line 72, "bromide" should read --- bromine ---. Column 3, line 10, "and desired" should read --- any desired ---. Column 3, line 27, "-16-pregnanes" should read --- -16-pregnenes ---. Column 9, line 27, "-5α.6α-" should read --- -5α,6α- ---. Column 10, line 26, "3-keo-" should read --- 3-keto- ---. Column 10, line 48, "-17-acyloxprogesterone," should read --- -17-acyloxyprogesterone, ---. Column 11, line 21, "-17α-acyloxprogesterone" should read --- -17α-acyloxyprogesterone ---. Column 11, line 35, "The 6β-chloro and 6β-fluoro-16-lower alkylidene-" should read --- The novel 9α,11β-dihalogeno-16-lower alkylidene- ---. Column 11, line 43, "methyl; and at the 2-carbon being fluorine or iodine." should read --- methyl; at the 17-carbon being hydroxy or acyloxy; and at the 21-carbon being fluorine or iodine. ---. Column 13, lines 43-44, "6α,9α-difluoro-16-fluoro-11β,17α-diacetoxy-16-methyleneprogesterone;" should read --- 6α,9α-difluoro-16-methylene-11β,17α-diacetoxy-progesterone; 6α-chloro-9α-fluoro-11β,17α-diacetoxy-16-methyleneprogesterone; ---. Column 13, line 65, "-17α-hydroxy-" should read --- -17α-acetoxy- ---. Column 13, line 70, "-16-methylene-17-" should read --- -16-methylene-17α- ---. Column 14, line 19, "The 17α-hydropregnadiene" should read --- The 17α-hydroxypregnadiene ---. Column 14, line 32, "-17-hydroxy-" should read --- -17α-hydroxy- --- Column 14, line 36, "-6α-fluoro-" should read --- -6α-chloro- ---. Column 14, line 37, "-17-acetoxyprogesterone," should read --- -17α-acetoxyprogesterone, ---. Column 14, lines 43, 44, and 45, "-6-dehydroprogesterone, and 6-chloro-" should read --- 6-dehydroprogesterone, 6-chloro- ---. Column 16, lines 5 and 6, "followed by dihydrobromination" should read --- followed by didehydrobromination ---. Column 16, line 11, "and 9,11-oxide," should read --- and 9,11-oxido, ---. Column 20, line 60, "poured ice-water," should read --- poured into ice water, ---. Column 21, Example 12, line 50, "-17α-hydroxyl-" should read --- -17α-hydroxy- ---.

UNITED STATES PATENT OFFICE
CERTIFICATE OF CORRECTION

Patent No. 3,519,619      Dated July 7, 1970

Inventor(s) E. B. Hershberg, E. P. Oliveto and R. C. Rausser

It is certified that error appears in the above-identified patent and that said Letters Patent are hereby corrected as shown below:

Column 22, Example 13, line 14, "-5,6-hichloro-" should read --- -5,6-dichloro- ---. Column 23, Example 15, line 45, "N-bromoaectamide" should read ---N-bromoacetamide ---. Column 23, Example 16, line 73, "ethylene" should read --- methylene ---. Column 26, Example 19, line 68, "-p-toulenesulfonate" should read --- -p-toluenesulfonate ---. Column 27, Example 21, line 43, "-11-hydroxy-" should read --- -11β-hydroxy- ---. Column 27, Example 21, line 46, "-1β-hydroxy-" should read --- -11β-hydroxy- ---.

SIGNED AND SEALED
OCT 20 1970

(SEAL)
Attest:

Edward M. Fletcher, Jr.
Attesting Officer

WILLIAM E. SCHUYLER, JR.
Commissioner of Patents